US008727892B1

(12) United States Patent
Chun

(10) Patent No.: US 8,727,892 B1
(45) Date of Patent: May 20, 2014

(54) REMOTE, LIVE, MULTIPLAYER CASINO GAMING TECHNIQUES IMPLEMENTED VIA COMPUTER NETWORKS

(71) Applicant: Novel Tech International Limited, Hong Kong (HK)

(72) Inventor: Jay Chun, Hong Kong (HK)

(73) Assignee: Novel Tech International Limited, Hong Kong (HK)

( * ) Notice: Subject to any disclaimer, the term of this patent is extended or adjusted under 35 U.S.C. 154(b) by 0 days.

(21) Appl. No.: 13/844,142

(22) Filed: Mar. 15, 2013

(51) Int. Cl.
*A63F 9/24* (2006.01)
*G06F 17/00* (2006.01)

(52) U.S. Cl.
USPC .................................. 463/42; 463/25; 463/40

(58) Field of Classification Search
USPC .............................. 463/11, 13, 16, 25, 40, 42
See application file for complete search history.

(56) References Cited

U.S. PATENT DOCUMENTS 6,241,608 B1 * 6/2001 Torango .......................... 463/27
7,762,887 B1 * 7/2010 House et al. .................... 463/25
7,922,587 B2 * 4/2011 Chun .............................. 463/42
2002/0147042 A1 * 10/2002 Vuong et al. .................... 463/40
2003/0013510 A1 * 1/2003 Vuong et al. .................... 463/13
2003/0236113 A1 * 12/2003 Webb .............................. 463/11
2006/0287101 A1 * 12/2006 Crawford et al. ............... 463/42
2007/0060259 A1 * 3/2007 Pececnik ......................... 463/16
2007/0265049 A1 * 11/2007 Black .............................. 463/13
2008/0096659 A1 * 4/2008 Kreloff et al. ................... 463/39
2009/0062008 A1 * 3/2009 Karmarkar ....................... 463/42
2009/0131151 A1 5/2009 Harris
2009/0131160 A1 5/2009 Torres
2009/0291762 A1 * 11/2009 Walker ............................ 463/42
2010/0105460 A1 4/2010 Makhoul
2012/0004037 A1 * 1/2012 Hill ................................. 463/42
2013/0203481 A1 * 8/2013 Miller et al. .................... 463/25

OTHER PUBLICATIONS

PCT International Search Report, PCT Application No. PCT/CN2013/074516 based on U.S. Appl. No. 13/844,142, International Filing Date Apr. 22, 2013, Search report mailed Jul. 25, 2013.

Written Opinion of International Searching Authority, PCT Application No. PCT/CN2013/074516 based on U.S. Appl. No. 13/844,142, International Filing Date Apr. 22, 2013, Written Opinion mailed Jul. 25, 2013.

* cited by examiner

*Primary Examiner* — Dmitry Suhol
*Assistant Examiner* — Jason Yen
(74) *Attorney, Agent, or Firm* — Dean E. Wolf, Esq.

(57) ABSTRACT

Various aspects described or referenced herein are directed to different methods, systems, and computer program products for conducting remote, live, multiplayer casino gaming techniques via computer networks.

53 Claims, 19 Drawing Sheets

1100

1190

REMOTE, LIVE, MULTIPLAYER CASINO GAMING TECHNIQUES IMPLEMENTED VIA COMPUTER NETWORKS

RELATED APPLICATION DATA

This application incorporates by reference in its entirety and for all purposes U.S. patent application Ser. No. 13/456,110, filed on Apr. 25, 2012, titled "Electronic Gaming Device," by Chun et al.

This application incorporates by reference in its entirety and for all purposes U.S. patent application Ser. No. 13/542,446, filed on 5 Jul., 2012, titled "Electronic Gaming Device," by Chun et al.

This application incorporates by reference in its entirety and for all purposes U.S. Provisional Patent Application Ser. No. 61/708,865, filed on 2 Oct., 2012, titled "SYSTEM AND METHOD FOR PROVIDING REMOTE WAGERING GAMES IN A LIVE TABLE GAME SYSTEM," by Chun et al.

BACKGROUND

The present disclosure relates to wager-based gaming technology. More particularly, the present disclosure relates techniques for implementing remote, live, multiplayer, wager-based gaming techniques via computer networks.

Online gaming has attempted to bring the casino experience into the home, and many different websites and downloadable applications are available to play many varieties of games, including but not limited to blackjack, poker, baccarat, roulette, craps, dice, etc. However, online gaming presents risks for remote players and also presents various type of consumer protection regulatory issues. For example, the ownership and gaming jurisdictions from which the host online casino is operating is not always easily transparent to the remote player. It also is very difficult, to determine the integrity of the games offered for play, and/or the integrity of a particular virtual shoe used by online casinos offering games of chance.

Online gaming also has its risks for the game provider, since many online casinos risk violating the law by accepting wagers from remote players who are minors, or who are located in countries or states where one or more forms of online gambling are illegal. Online casinos face difficulty in verifying the age and location of the remote player, both of which may be essential to verify that the player has a legitimate right to play games on the website.

DETAILED DESCRIPTION OF EXAMPLE EMBODIMENTS

Overview

Figure 1:
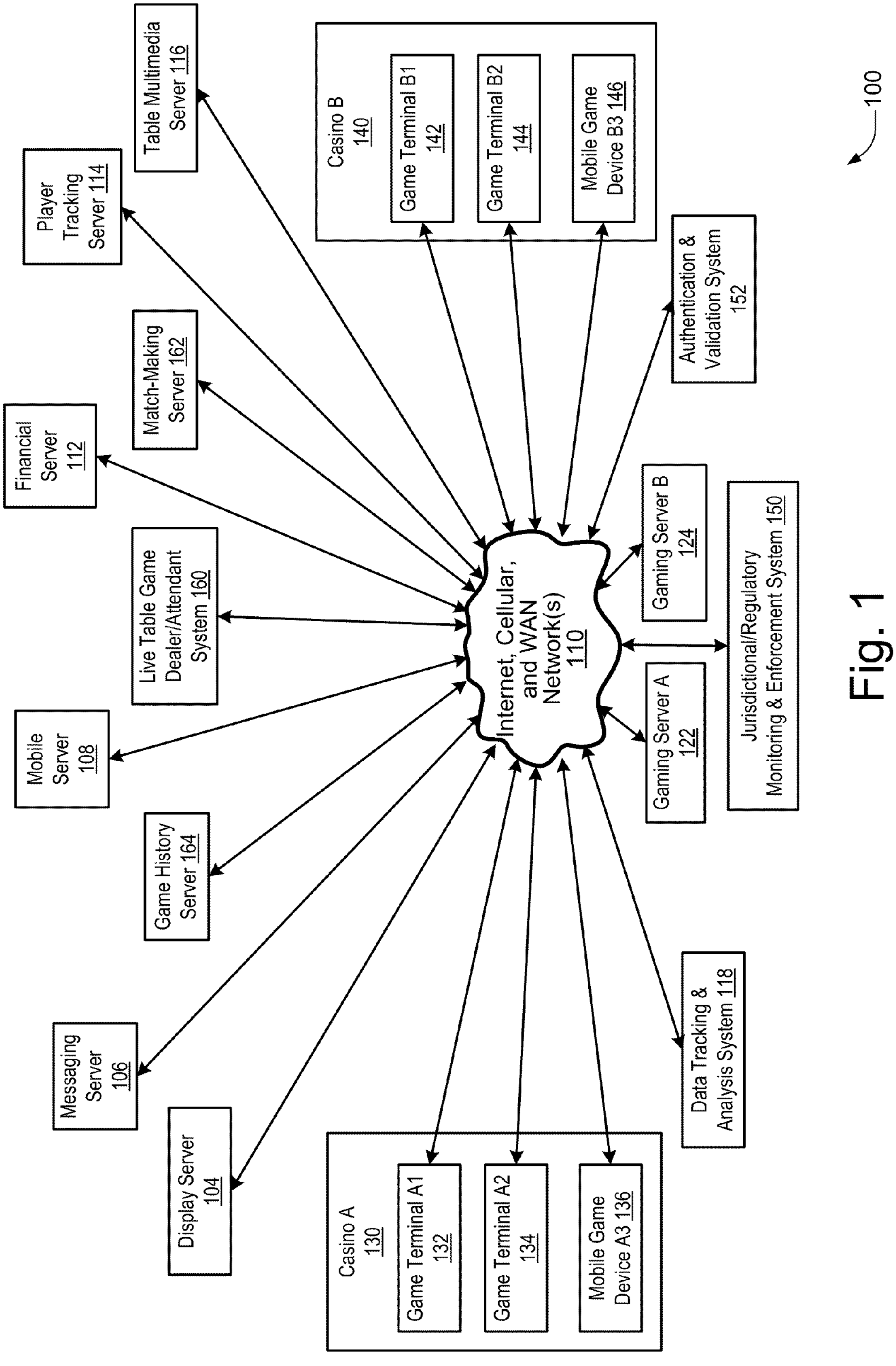
FIG. 1 illustrates a simplified block diagram of a specific example embodiment of a Gaming Network 100 which may be configured or designed to implement various remote, live, multiplayer wager-based gaming techniques described and/or referenced herein.

Various aspects described or referenced herein are directed to different methods, systems, and computer program products for conducting remote, live, multiplayer casino gaming techniques via computer networks.

One aspect disclosed herein is directed to different methods, systems, and computer program products for enabling casino venues to provide opportunities for their players/patrons to participate in live, competitive, wager-based card games and wager-based table games where players from the same or different casinos are able to compete against one another in a live, multiplayer, virtual game table environment. In at least one embodiment, players can be located at the same and/or at remote gaming venues that are connected via a wide area network such as the Internet, cellular networks, VPNs, cloud-based networks, etc.

Another aspect disclosed herein is directed to a gaming system in a casino gaming network, comprising: a live casino game table; a first electronic game terminal ("EGT") located in a first physical casino venue, the first EGT being remotely located from the live casino game table; a second electronic game terminal ("EGT") located in a second physical casino venue, the second EGT being remotely located from the live casino game table; a gaming controller; memory; the system being operable to: control a first active, multi-player, wager-based game session ("first game session") conducted at the live casino game table; enable the first player to participate in the first game session using the first EGT; enable the second player to participate in the first game session using the second EGT; and; advance a game state of the first game session via a first set of activities performed by a live person interacting with the first live game table. In at least one embodiment, the first and second EGTs are each configured to be legally compliant with jurisdictional regulations governing play of wager-based games at legally authorized casino venues.

In at least one embodiment, various method(s), system(s) and/or computer program product(s) may be operable to: control a first active, multi-player, wager-based game session ("first game session") conducted at the live casino game table;

enable the first player to participate in the first game session using the first EGT; enable the second player to participate in the first game session using the second EGT; and; advance a game state of the first game session via a first set of activities performed by a live person interacting with the first live game table; receive first player game play instructions from the first EGT; receive second player game play instructions from the second EGT; and advance the game state of the first game session using the first player game play instructions and the second player game play instructions.

In at least one embodiment, various method(s), system(s) and/or computer program product(s) may be operable to: generate a virtual game table graphical user interface ("virtual game table GUI") which represents the live casino game table, wherein the virtual game table GUI includes a representation of the first player located at a first player station of the first virtual game table, and wherein the representation of the first virtual game table includes a representation of the second player located at a second player station of the first virtual game table; cause a first instance of the virtual game table GUI to be displayed at the first EGT; enable the first player to participate in the first game session via interaction with the first instance of the virtual game table GUI; and; cause a second instance of the virtual game table GUI to be displayed at the second EGT; enable the second player to participate in the first game session via interaction with the second instance of the virtual game table GUI.

In at least one embodiment, various method(s), system(s) and/or computer program product(s) may be operable to: generate a first virtual game table graphical user interface ("virtual game table GUI") which represents the live casino game table, wherein the virtual game table GUI includes a representation of the first player located at a first player station of the first virtual game table, and wherein the representation of the first virtual game table includes a representation of the second player located at a second player station of the first virtual game table; cause a first instance of the virtual game table GUI to be displayed at the first EGT; enable the first player to participate in the first game session via interaction with the first instance of the virtual game table GUI; cause a second instance of the virtual game table GUI to be displayed at the second EGT; enable the second player to participate in the first game session via interaction with the second instance of the virtual game table GUI; determine a current game state of the first game session based upon gaming activities conducted at the first live game table; and; update content presented in the first and second instances of the virtual game table GUI to reflect a current game state at the first virtual game table which is substantially similar to the current game state of the first game session.

In at least one embodiment, various method(s), system(s) and/or computer program product(s) may be operable to: generate a first virtual game table graphical user interface ("virtual game table GUI") which represents the live casino game table, wherein the virtual game table GUI includes a representation of the first player located at a first player station of the first virtual game table, and wherein the representation of the first virtual game table includes a representation of the second player located at a second player station of the first virtual game table; cause a first instance of the virtual game table GUI to be displayed at the first EGT; enable the first player to participate in the first game session via interaction with the first instance of the virtual game table GUI; cause a second instance of the virtual game table GUI to be displayed at the second EGT; enable the second player to participate in the first game session via interaction with the second instance of the virtual game table GUI; affect a current game state of the first game session via execution of a first set of game-related instructions provided by the first player via interaction with the first instance of the virtual game table GUI; and; affect the current game state of the first game session via execution of a second set of game-related instructions provided by the second player via interaction with the second instance of the virtual game table GUI.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

As discussed previously, online gaming has risks for the game provider, since, for example, many online casinos risk violating the law by accepting wagers from remote players who are minors, or who are located in countries or states where one or more forms of online gambling are illegal. Online casinos also face difficulty in verifying the age and location of the remote player, both of which may be essential to verify that the player has a legitimate right to play online wager-based games. Currently, the majority of real-world (e.g., physical) casinos issue Player Tracking Cards ("PTC") to customers who produce a valid, government-issued photo ID verifying that the customer is legally of age to gamble in the gaming jurisdiction of the issuing real-world casino. However, most online gambling sites do not have the ability to accept and verify Player Tracking Cards, especially those issued by an unrelated entity. Accordingly, various aspects described herein relate to new and improved techniques and functionality for enabling players to safely participate in online or network-based wager-based gaming sessions. Additionally, other aspects described herein relate to new and improved techniques and functionality for enabling real-world casino venues to securely and legally provide opportunities for their players/patrons to participate in online or network-based wager-based gaming sessions.

FIG. 1 illustrates a simplified block diagram of a specific example embodiment of a Gaming Network 100 which may be configured or designed to implement various remote, live, multiplayer wager-based gaming techniques described and/or referenced herein. As described in greater detail herein, different embodiments of Gaming Networks may be configured, designed, and/or operable to provide various different types of operations, functionalities, and/or features generally relating to Gaming Network technology. Further, as described in greater detail herein, many of the various operations, functionalities, and/or features of the Gaming Network(s) and/or Gaming System(s) disclosed herein may provide may enable or provide different types of advantages and/or benefits to different entities interacting with the Gaming Network(s).

According to different embodiments, at least some Gaming Network(s) may be configured, designed, and/or operable to provide a number of different advantages and/or benefits and/or may be operable to initiate, and/or enable various different types of operations, functionalities, and/or features, such as, for example, one or more of the following (or combinations thereof):

- Enable real-world casino venues to securely and legally provide opportunities for their players/patrons to participate in online or network-based wager-based gaming sessions. Examples of various types of games which may be played may include, but are not limited to, one or more of the following (or combinations thereof): "Heads Up" type card games (e.g., where players compete either 1-on-1 or player vs. casino/house/computer opponent); poker, black jack, Baccarat, Mahjong, Dou DI Zhu 斗地主, chess-type games, etc.
- Enable casino venues to provide opportunities for their players/patrons to participate in live, competitive, wager-based card games and wager-based table games where players from different casinos are able to compete against one another in a live, multiplayer, virtual game table environment. In at least one embodiment, players can be located at the same and/or at remote gaming venues that are connected via a wide area network such as the Internet, cellular networks, VPNs, cloud-based networks, etc.
- Utilize live game table dealers and attendants for conducting the live, multiplayer, wager-based, virtual table games.
- Display to players of a given live virtual table game: a live video stream of live game table dealer dealing out cards, and/or a live video stream of a live game table attendant who is conducting a live game session at a physical game table.
- Deploy electronic game terminals (EGTs) in multiple different physical casino venues, and utilize the EGTs for enabling casino patrons/players to participate in live, multiplayer, wager-based, virtual table games. In some embodiments, each of the EGTs is remotely located from the live game table dealer/attendant.
- Provide the ability for multiple different live virtual table game sessions (involving different groups of players in each of the different live virtual table game sessions) to be conducted using the same, common live game table dealer/attendant. (see, e.g., FIGS. 12-13)
- Provide Virtual Live Play (VLP) functionality for enabling divergent playing card distributions in multiple different live virtual table game sessions which were initiated using a common live game table dealer/attendant.
- Live virtual table game sessions may be remotely conducted using physical playing cards and/or using physical game table equipment. In at least some embodiments, the distribution of cards to players participating in a live virtual table game session is not implemented using computerized random number generation (RNG). For example, in some embodiments, the game data (e.g., cards dealt, dice rolls, roulette wheel spin/ball landing, etc.) are generated by a live game table dealer or attendant. In other embodiments, the distribution of cards to players participating in a live virtual table game session may be implemented using computerized random number generation (RNG) (e.g., via RNG-based virtual dealer operated by a game server).

Provide each player of a live, multiplayer, wager-based, virtual table game session with a streamed video or video+audio feed of the other player(s) participating in that gaming session. In at least one embodiment, a player's EGT may include a built in camera, microphone and/or speakers for enabling the players of a given gaming session to converse with each other during game play, and to view the facial expressions and behaviors of other players during game play (which, for example, may be advantageously used in bluffing type games such as poker). In other embodiments, players may be prevented from viewing the other players. For example, in one embodiment, the system may assign a random player name to each respective player at the commencement of each new gaming session or round of play in order to prevent or discourage cheating among colluding players.

Players may be allowed to manually switch or change their opponents (e.g., in heads-up game play).

Players maybe automatically switched (e.g., by gaming system) to play different opponents (e.g., auto switching feature; useful for tournament play).

Gaming system may perform automated matching of players in tournament (e.g., based on various criteria such as, for example: skill level, experience, random, social relationships, etc.). In at least one embodiment, multi-property network connections between various different casino venues (e.g., located at different geographic locations) may be implemented and utilized to facilitate pairing of and/or participation by remote players.

In at least one embodiment, a central clearing house may be utilized for financial transactions (e.g., deposit, debit of player accounts, payouts, lines of credit, etc.) relating to the live virtual table game sessions.

Various types of game play rules may be implemented and automatically enforced for the live virtual table game sessions, such as, for example: time limit per play, amount per wager, max wager, maximum wager, rules to facilitate speed of game play, rules imposed for conformance with regulatory or jurisdiction requirements, etc. For example, in one embodiment, if a player failed to make a wager within an allotted time interval, the system may be configured or designed to automatically enter default wager for that player.

According to different embodiments, the Gaming Network 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Gaming Network may include one or more of the following types of systems, components, devices, processes, etc. (or combinations thereof):

Display Server System(s) 104. In at least one embodiment, the Display Server System(s) may be configured or designed to implement and/or facilitate management of content (e.g., graphics, images, text, video fees, etc.) to be displayed and/or presented at one or more EGTs (or at one or more groups of EGTs), dealer displays, administrator displays, etc.

Table Multimedia Server System(s) 116. In at least one embodiment, the Table Multimedia Server System(s) may be configured or designed to generate, implement and/or facilitate management of content (e.g., graphics, images, text, video fees, audio feeds, etc.), which, for example, is to be streamed or provided to one or more EGTs (or to one or more groups of EGTs).

Messaging Server System(s) 106. In at least one embodiment, the Messaging Server System(s) may be configured or designed to implement and/or facilitate management of messaging and/or other communications among and between the various systems, components, devices, EGTs, players, dealers, and administrators of the gaming network.

Mobile Server System(s) 108. In at least one embodiment, the Mobile Server System(s) may be configured or designed to implement and/or facilitate management of communications and/or data exchanged with various types of mobile devices, including for example: player-managed mobile devices (e.g., smart phones, PDAs, tablets, mobile computers), casino-managed mobile devices (e.g., mobile gaming devices), etc.

Live game table Dealer/Attendant System(s) 160. In at least one embodiment, the Live game table Dealer/Attendant System(s) may include one or more physical game tables, and may include one or more live dealers or attendants who are assigned to conduct game play activities at specific physical game tables. The Live game table Dealer/Attendant System(s) may be configured or designed to facilitate and conduct the live game table play activities relating to one or more live, multiplayer, wager-based, virtual table game sessions. In at least one embodiment, the Live game table Dealer/Attendant System(s) may be located in a physical environment which is isolated from the players of the live virtual table games.

Financial Server System(s) 112. In at least one embodiment, the Financial Server System(s) may be configured or designed to implement and/or facilitate tracking, management, reporting, and storage of financial data and financial transactions relating to one or more live virtual table game sessions. For example, at least some Financial Server System(s) may be configured or designed to track of the game accounting (money in, money out) for a virtual table game being played, and may also be configured or designed to handle various financial transactions relating to player wagers and payouts. For example, in at least one embodiment, Financial Servers may be configured or designed to monitor each remote player's account information, and may also manage or handle funds transfers between each player's account and the active game server (e.g., associated with the player's game session).

Player Tracking Server System(s) 114. In at least one embodiment, the Player Tracking Server System(s) may be configured or designed to implement and/or facilitate management and exchange of player tracking information associated with one or more EGTs, live virtual table game sessions, etc. In at least one embodiment, a Player Tracking Server System may include at least one database that tracks each player's hands, wins/losses, bet amounts, player preferences, etc., in the network. In at least one embodiment, the presenting and/or awarding of promotions, bonuses, rewards, achievements, etc., may be based on a player's play patterns, time, games selected, bet amount for each game type, etc. A Player Tracking Server System may also help establish a player's preferences, which assists the casino in their promotional efforts to: award player comps (loyalty points); decide which promotion(s) are appropriate; generate bonuses; etc.

Data Tracking & Analysis System(s) 118. In at least one embodiment, the Data Tracking & Analysis System(s) may be configured or designed to implement and/or facilitate management and analysis of game data. For example, in one embodiment the Data Tracking & Analysis System(s) may be configured or designed to aggregate multisite virtual game table trends, local wins, jackpots, etc.

Gaming Server System(s) (122, 124). In at least one embodiment, Different game servers may be configured or designed to be dedicated to one or more specifically designated type(s) of game(s) (e.g., Baccarat, Black Jack, Poker, Mahjong, Paigow, Chess, etc.). Each game server has game logic to host one of more virtual table game sessions. At least some game server(s) may also capable of keeping track of the game accounting (money in, money out) for a virtual table game being played, and/or for updating the Financial Servers at the end of each game. The game servers may also operable to generate the virtual table graphics primitives (e.g., game pieces and game states), and may further be operable to update the remote EGTs when a game state change (e.g., new card dealt, player upped the ante, player folds/busts, etc.) has been detected.

Jurisdictional/Regulatory Monitoring & Enforcement System(s) 150. In at least one embodiment, the Jurisdictional/Regulatory Monitoring & Enforcement System(s) may be configured or designed to handle tracking, monitoring, reporting, and enforcement of specific regulatory requirements relating to wager-based gameplay activities in one or more jurisdictions.

Authentication & Validation System(s) 152. According to different embodiments, the Authentication & Validation System(s) may be configured or designed to determine and/or authenticate the identity of the current player at a given EGT. For example, in one embodiment, the current player may be required to perform a log in process at the EGT in order to access one or more features. Alternatively, the EGT may be adapted to automatically determine the identity of the current player based upon one or more external signals such as, for example, scanning of a barcode of a player tracking card, an RFID tag or badge worn by the current player which provides a wireless signal to the EGT for determining the identity of the current player. In at least one implementation, various security features may be incorporated into the EGT to prevent unauthorized players from engaging in certain types of activities at the EGT. In some embodiments, the Authentication & Validation System(s) may be configured or designed to authenticate and/or validate various types of hardware and/or software components, such as, for example, hardware/software components residing at a remote EGTs, game play information, wager information, player information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Casino Venues (130, 140). In at least one embodiment, each casino venue may correspond to a real-world, physical casino which is located at a particular geographic location. In some embodiments, a portion of the multiple different casino venues may be affiliated with each other (e.g., Harrah's Las Vegas, Harrah's London). In other embodiments, at least a portion of the multiple different casino venues do not share any affiliation with each other.

Electronic Game Terminals (EGTs) 132, 134, 136, 142, 144, 146. As described in greater detail herein, the EGTs may be configured or designed to facilitate and enable players to participate in live, multiplayer, wager-based, virtual table game sessions (and/or other types of live virtual table game sessions). Different EGTs may be physically located in one or more different casino venues, and may be connected via a communication network. In some embodiments, EGTs may be implemented as stationary machines (as illustrated, for example, in FIG. 10). In some embodiments, at least some EGTs may be implemented using mobile devices (e.g., tablets, smartphones, laptops, PC's, and the like).

Internet, Cellular, and WAN Network(s) 110

Match-Making Server(s) 162. In at least one embodiment, the Match-Making Server(s) may be configured or designed to collect and track player IDs, skill levels, preferences, etc., and allocate or assign a given player to an appropriate or suitable virtual game table based on various criteria such as, for example, one or more of the following (or combinations thereof): game-based criteria, availability, player preferences, skill level, player status, wager-based criteria, game type, etc.

Game History Server(s) 164. In at least one embodiment, the Game History Server(s) may be configured or designed to track all (or selected) game types and game play history for all (or selected) virtual game tables. In at least one embodiment, a Game History Server may be configured or designed to assists the remote players in selecting a table by, for example, displaying the win/loss statistics of the tables selected by the player as potential candidates to participate. In some embodiments, a Game History Server may also assist the casino manager in case of disputes between players and the casino by, for example, providing the ability to "replay" (e.g., by virtually recreating the game events) the game in dispute, step by step, based on previously stored game states. Such dispute resolution capability is a desirable feature in live virtual table game environments.

Remote Database System(s) which, for example, may be operable to store and provide access to various types of information and data described herein.

Remote Server System(s)/Service(s), which, for example, may include, but are not limited to, one or more of the following (or combinations thereof):
- Content provider servers/services
- Media Streaming servers/services
- Database storage/access/query servers/services
- Financial transaction servers/services
- Payment gateway servers/services
- Electronic commerce servers/services
- Event management/scheduling servers/services
- Etc.

Figure 6:
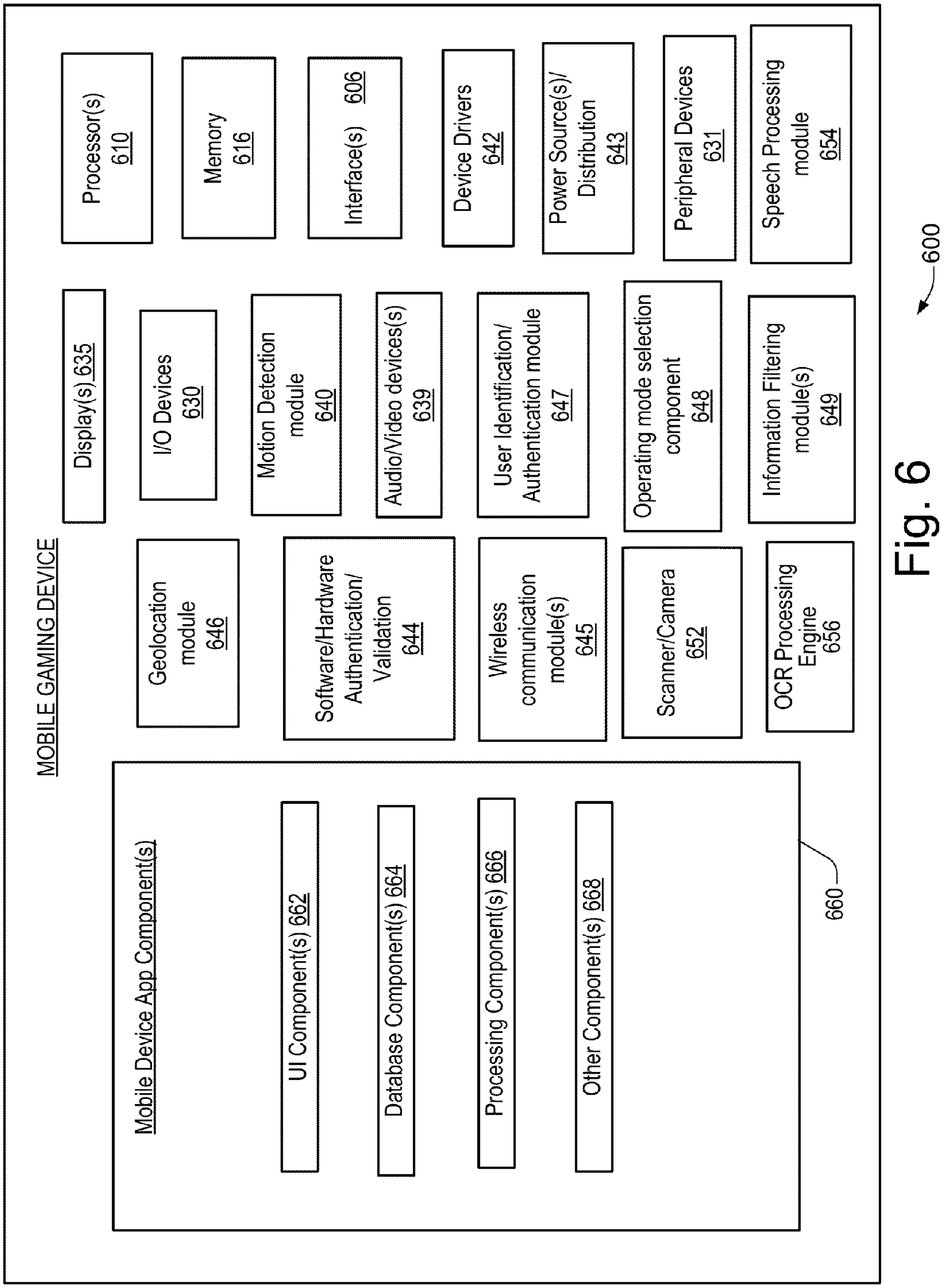
FIG. 6 is a simplified block diagram of an exemplary mobile gaming device 600 in accordance with a specific embodiment.

Mobile Device(s) 160 —In at least one embodiment, the Mobile Device(s) may be operable to perform and/or implement various types of functions, operations, actions, and/or other features such as those described or referenced herein (e.g., such as those illustrated and/or described with respect to FIG. 6).

In at least one embodiment, the Gaming Network may be operable to utilize and/or generate various different types of data and/or other types of information when performing specific tasks and/or operations. This may include, for example, input data/information and/or output data/information. For example, in at least one embodiment, the Gaming Network may be operable to access, process, and/or otherwise utilize information from one or more different types of sources, such as, for example, one or more local and/or remote memories, devices and/or systems. Additionally, in at least one embodiment, the Gaming Network may be operable to generate one or more different types of output data/information, which, for example, may be stored in memory of one or more local and/or remote devices and/or systems. Examples of different types of input data/information and/or output data/information which may be accessed and/or utilized by the Gaming Network may include, but are not limited to, one or more of those described and/or referenced herein. According to specific embodiments, multiple instances or threads of the Gaming Network processes and/or procedures may be concurrently implemented and/or initiated via the use of one or more processors and/or other combinations of hardware and/or hardware and software.

According to different embodiments, various different types of encryption/decryption techniques may be used to facilitate secure communications between devices, systems, and/or components of the Gaming Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well known hardware-based and/or software-based security components, and/or any other known or yet to be devised security and/or hardware and encryption/decryption processes implemented in hardware and/or software.

It will be appreciated that the Gaming Network of FIG. 1 is but one example from a wide range of Gaming Network embodiments which may be implemented. Other embodiments of the Gaming Network (not shown) may include additional, fewer and/or different components/features that those illustrated in the example Gaming Network embodiment of FIG. 1.

Generally, the live virtual table game techniques described herein may be implemented in hardware and/or hardware+software. Hardware and/or software+hardware hybrid embodiments of the live virtual table game techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
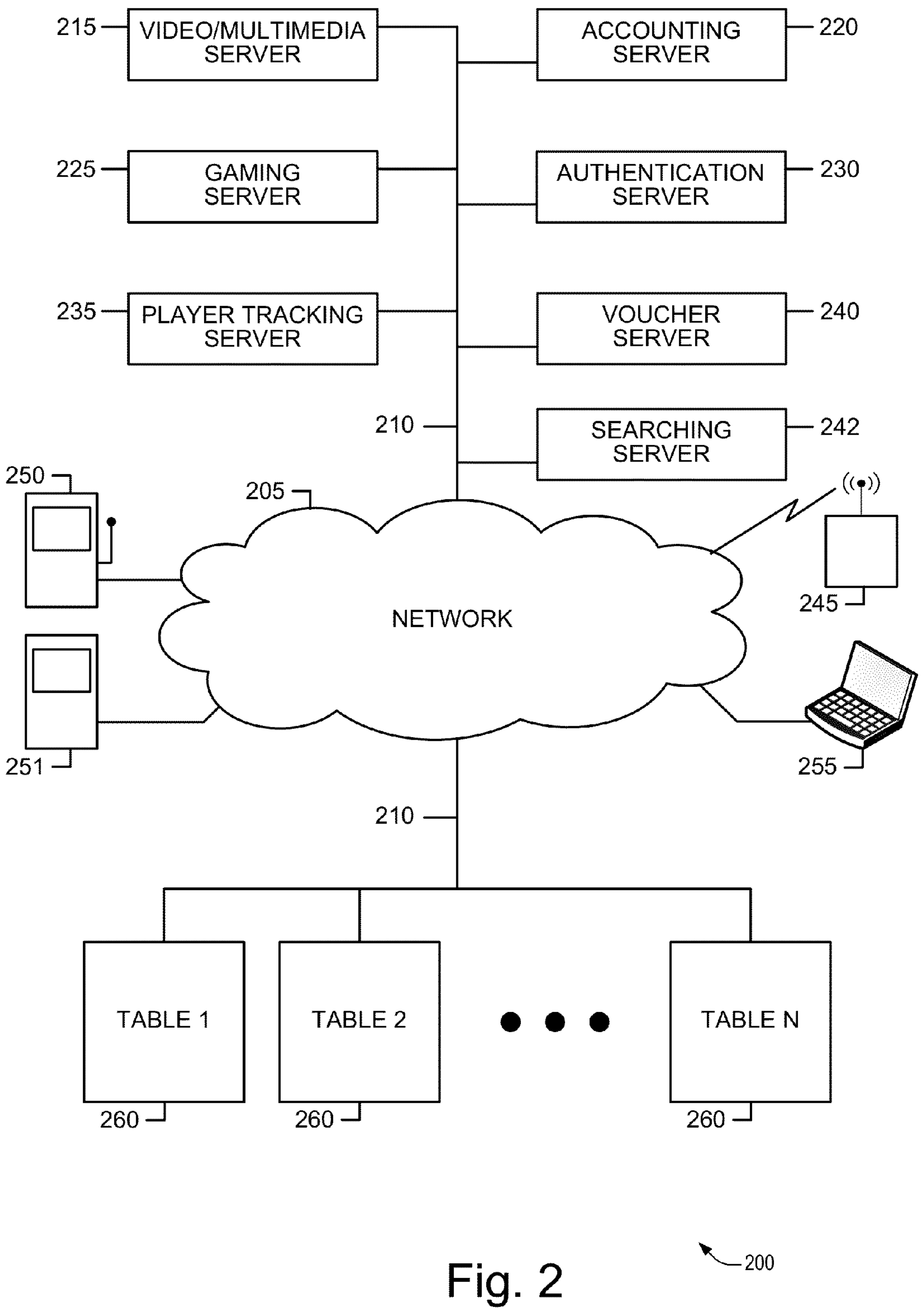
FIG. 2 shows an example block diagram of an electronic gaming system 200 in accordance with a specific embodiment.

FIG. 2 shows an example block diagram of an electronic gaming system 200 in accordance with a specific embodiment. Electronic gaming system 200 may include electronic gaming tables 260, which may be coupled to network 205 via a network link 210. Electronic gaming tables 260 may be normal gaming tables with enhanced electronic capabilities. Network 205 may be the internet or a private network. One or more video streams may be received at video/multimedia server 215 from gaming tables 260. Video/Multimedia server 215 may transmit one or more of these video streams to a mobile device 245, a gaming device 250, an EGT 251, a laptop 255, and/or any other remote electronic device. Video/Multimedia server 215 may transmit these video streams via network link 210 and network 205.

Electronic gaming system 200 may include an accounting/transaction server 220, a gaming server 225, an authentication server 230, a player tracking server 235, a voucher server 240, and a searching server 242.

Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.

Gaming server 225 may generate gaming options based on predetermined betting structures and/or outcome categories. These gaming options may be predetermined gaming options, contingent gaming options, and/or any other gaming option disclosed in this disclosure.

Authentication server 230 may determine the validity of vouchers, players' identity, and/or an outcome for a gaming event.

Player tracking server 235 may track a player's betting activity, a player's preferences (e.g., language, drinks, font, sound level, etc.). Based on data obtained by player tracking server 235, a player may be eligible for gaming rewards (e.g. free play), promotions, and/or other awards (e.g., complimentary food, drinks, lodging, concerts, etc.).

Voucher server 240 may generate a voucher, which may include data relating to gaming options. For example, data relating to the structure (e.g., 6 out of the next 10 rolls at craps table 4 will be a 7 or 11) may be generated. If there is a time deadline, that information may be generated by voucher server 240. Vouchers may be physical (e.g., paper) or digital.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers.

Searching server 242 may include one or more searching structures, one or more searching algorithms, and/or any other searching mechanisms. In general, the search structures may cover which table games paid out the most money during a time period, which table games kept the most money from players during a time period, which table games are most popular (top games), which table games are least popular, which table games have the most amount of money wager during a period, which table games have the highest wager volume, which table games are more volatile (volatility, or deviation from the statistical norms, of wager volume, wager amount, pay out, etc.) during a time period, and the like. Search may also be associated with location queries, time queries, and/or people queries (e.g., where are the table games that most of my friends wager on, where are my favorite dealers, what do players wager on the most today, when are most wagers placed, etc.).

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular table, a particular game, a particular dealer, a particular casino, a particular location within a casino, game outcomes over a time period, payout over a time period, and/or any other criteria.

Searching algorithms may be dynamic searching programs, which may be modified based on one or more past results. For example, a search algorithm may be based on searching blackjack tables. The search algorithm may initially search blackjack tables 1-10 to determine whether any triggering events have occurred. Based on one or more previous searches, the search algorithm may determine: (1) that blackjack tables 1-4 are only opened from 7 pm to 3 am; (2) that blackjack tables 5-7 are opened twenty-four hours a day; and (3) that blackjack tables 8-10 are only opened from 7 am to 5 pm. The search algorithm may then modify the search parameters utilized based on this data. For example, if the search algorithm is initiated at 6 pm to determine blackjack triggering events, then the search algorithm may only search blackjack tables 5-7 because these blackjack tables are the only blackjack tables operating at that specific time.

Figure 3:
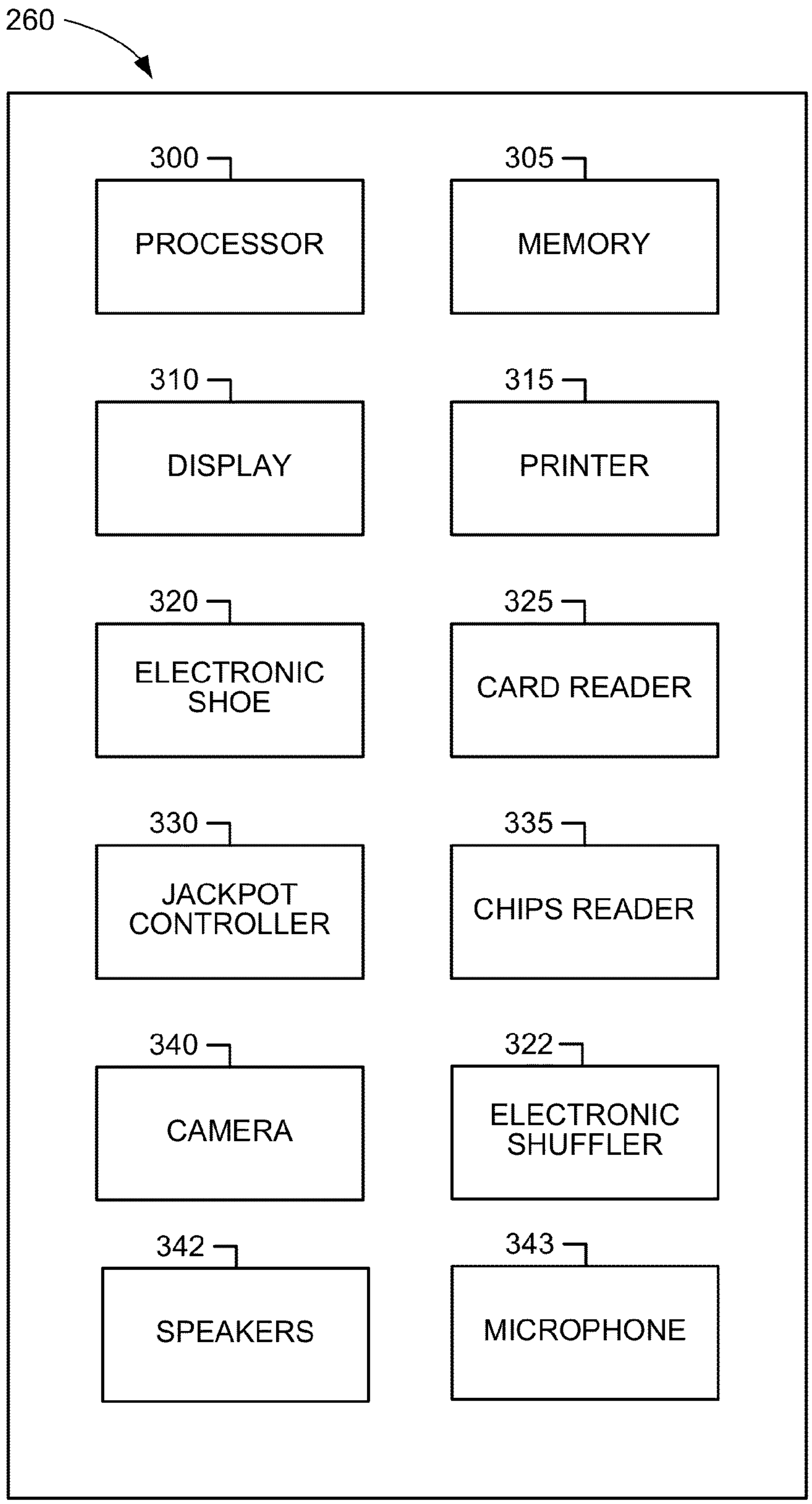
FIG. 3 shows electronic gaming table 260 with various features, in accordance with a specific embodiment.

In another example, the search algorithm may determine that a specific triggering event occurs with a ninety percent success rate on a first table, a ten percent success rate on a second table, a fifty percent success rate on a third table, and a seventy percent success rate on a fourth table. The search algorithm may generate a search priority based on the probability of success, which may lead to the first table being searched first, the fourth table being searched second, the third table being searched third, and the second table being searched fourth. Search algorithm may utilize any dynamic feedback procedure to enhance current and/or future searching results FIG. 3 shows electronic gaming table 260 with various features, in accordance with a specific embodiment. Various different embodiments of the electronic gaming table 260 may be used as a live game table for conducting gameplay relating to one or more live virtual table game sessions.

Electronic gaming table 260 may include a processor 300, a memory 305, a display 310, a printer 315, an electronic shoe 320, an electronic shuffler 322, a smart card reader 325, a jackpot controller 330, a chips reader 335, and a camera 340.

Processor 300 may be communicatively coupled to any other device in electronic gaming table 260. Processor 300 via an interface may communicate, wired or wireless, with any of the elements of electronic gaming device 100 and/or electronic gaming system 200.

Memory 305 may include data relating to gaming events, video streams transmitted from electronic gaming table 260, winning and losing percentages for gaming options relating to electronic gaming table 260, and game management data (e.g., dealer schedule, chip refills, etc.).

Display 310 may show previous game results, a betting structure, outstanding wagers, transaction volume, present value of betting options, a table minimum wager, a table maximum wager, wager and/or game play instructions input by one or more remote players (e.g., via their respective EGTs), instructions to the live dealer/attendant relating to game play activities to be performed by the dealer/attendant, video data, and/or any other type of data or content.

Printer 315 may generate vouchers, promotional items, food tickets, event tickets, and/or lodging tickets. Vouchers may be physical (e.g., paper) or digital.

Electronic shuffler 322 may be configured or designed to automatically shuffle multiple decks of cards, and to track the relative order of each of the cards of the shuffled decks of cards. The electronic shuffler can include an off the shelf unit. A dealer can use the electronic shuffler to shuffle the decks of cards before dealing the required hands, and place the shuffled decks of cards into the electronic shoe 320. In this way, the electronic gaming table may determine the relative order of all cards in the card shoe at the start of one or more game session(s), and/or at all other times of game play.

Electronic shoe 320 may obtain data and/or images of gaming objects utilized with gaming table 260. This data and/or images may be transmitted to electronic gaming terminal and displayed as images from table games. For example, on a blackjack table a ten of spades may be dealt to a player. This information is obtained via electronic shoe 320 and utilized to generate an image and/or illustration of a ten of spades card on an electronic gaming terminal. In another example, electronic shoe 320 may receive data relating to the numbers on dice, transmit this data to electronic gaming terminal, which may be utilized to generate an image/illustration of the dice on electronic gaming terminal.

In at least one embodiment, the electronic shoe can include an electronic reading system, such as an optical reader for recognizing the face value of each card. The electronic shoe can be designed to communicate directly with the card dealing/shuffling system to read or otherwise obtain the value of each card being dealt by the dealer as the card leaves the card dealing/shuffling system. For example, an optical reader or similar device can be attached to the card dealing/shuffling system, and the electronic shoe can obtain the scanned value of cards in the card dealing/shuffling system. In some implementations, the electronic shoe can interface with the table to read the value of each card being dealt by the dealer. For example, the table can include one or more scanning interfaces to scan each card before or after the card is dealt by the dealer. The electronic shoe can communicate with the one or more scanning interfaces to obtain the value of each card before or after the card is dealt by the dealer.

Card reader 325 may provide identification, authentication, and application processing functions. Card reader 325 may interface with smart cards, magnetic striped card, bar code reader, RFID card, and the like.

Jackpot controller 330 may track and compile data associated with a jackpot. Jackpot controller 330 may award the jackpot on a specific occurrence (e.g., blackjack event, dealing a royal flush, etc.) and/or randomly award a jackpot.

Chips reader 335 may compile and track data associated with the amount of chips one or more players possesses, the amount of chips won/lost at gaming table 260, the amount of chips in the dealer's rack at gaming table 260, an amount of chips wager by one or more players, amount of chips in the betting pool, and/or any combination thereof.

Camera 340 may obtain data from gaming table 260. Camera 340 may be one or more cameras located to view the gaming objects (e.g., cards, dice, dominos, ball, wheel, etc.), the dealer, the shoe, the players' hands, the players, and/or any combination thereof. Camera 340 may transmit this data to gaming table, which may be utilized to generate an image/illustration of the gaming objects.

Speakers 342 may be used to provide audio information to the game table dealer/attendant. Examples of different types of audio information may include, for example, audio instructions and/or other audio/verbal communications from one or more remote players, computer-generated audio instructions/content, sound effects, and/or other types of audio content.

Microphone 343 may be used to capture, record, and/or stream audio information from the electronic gaming table region, which, for example, may include verbal communications from the table game dealer/attendant.

According to specific embodiments, a variety of different game states may be used to characterize the state of current and/or past events which are occurring (or have occurred) at a given live gaming table. For example, in one embodiment, at any given time in a game, a valid current game state may be used to characterize the state of game play (and/or other related events, such as, for example, mode of operation of the gaming table, etc.) at that particular time. In at least one embodiment, multiple different states may be used to characterize different states or events which occur at the gaming table at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the gaming table may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming table. Examples of such entities may include, but are not limited to, one or more of the following (or combination thereof): master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

According to a specific embodiment, local game tracking components at the gaming table may be operable to automatically monitor game play activities at the gaming table, and/or to automatically identify key events which may trigger a transition of game state from one state to another as a game progresses. For example, in the case of Blackjack, a key event may include one or more events which indicate a change in the state of a game such as, for example: a new card being added to a card hand, the split of a card hand, a card hand being moved, a new card provided from a shoe, removal or disappearance of a card by occlusion, etc.

Depending upon the type of game being played at the gaming table, examples of other possible key events may include, but are not limited to, one or more of the following (or combination thereof):

start of a new hand/round;
end of a current hand/round;
start of a roulette wheel spin;
game start event;
game end event;
initial wager period start;
initial wager period end;
initial deal period start;
initial deal period end;
player card draw/decision period start;
player card draw/decision period end;
subsequent wager period start;
subsequent wager period end;
rake period start;
rake period end;
payout period start;
payout period end;
start of card burning period;
end of card burning period;
etc.

Figure 4:
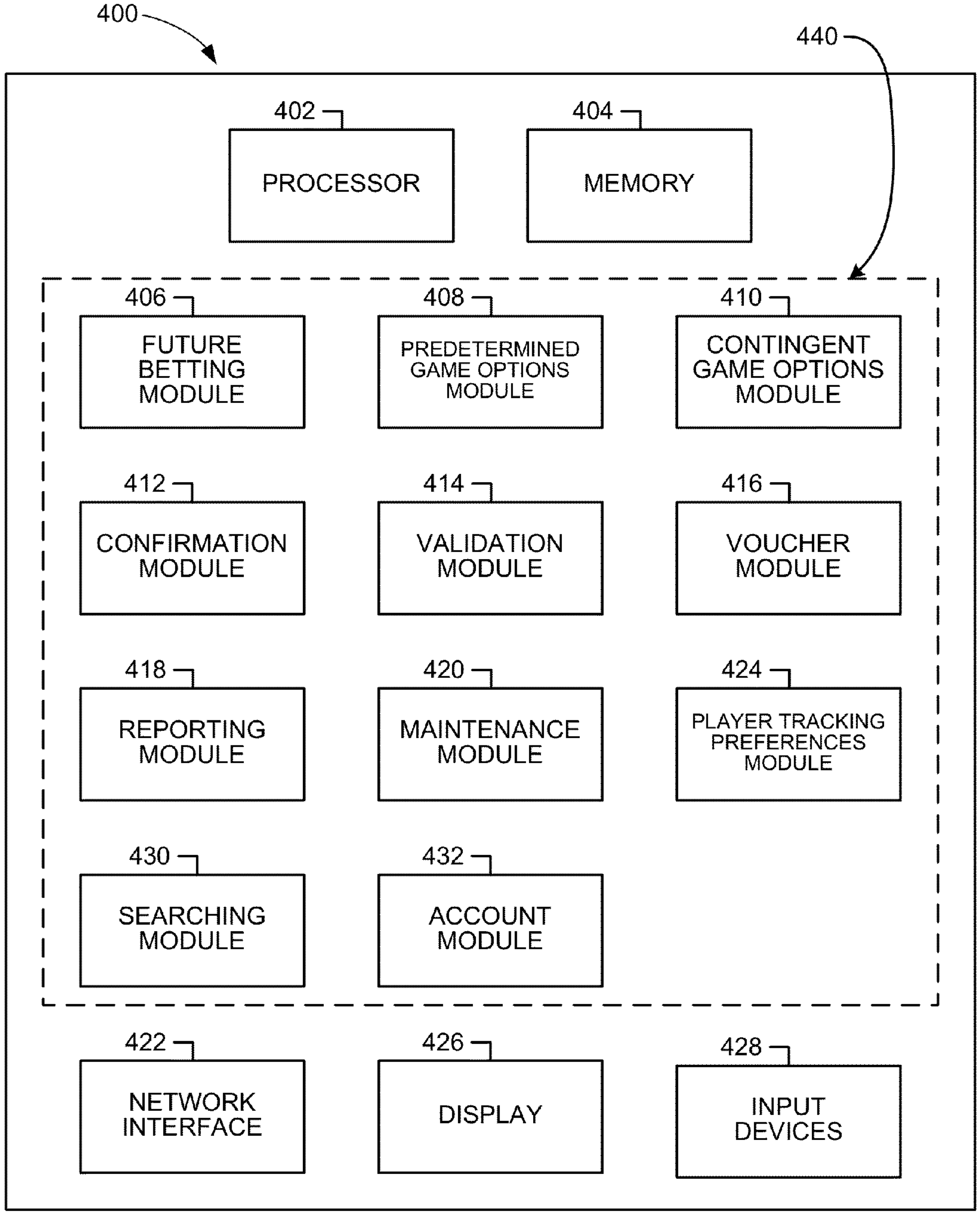
FIG. 4 shows a block diagram 400 of electronic gaming terminal 400, in accordance with a specific embodiment.

FIG. 4 shows a block diagram 400 of electronic gaming terminal 400, in accordance with a specific embodiment. Electronic gaming terminal 400 may include a processor 402, a memory 404, a network interface 422, input devices 428, and a display 426.

Processor 402 may generate gaming options based on predetermined betting structures and/or outcome categories. As previously discussed in the craps example above, predetermined betting structures may include outcome categories. In that example, there were three outcome categories (e.g., outcome equaling a seven, outcome not equaling a hard number, and outcome not equaling a craps). Predetermined betting structures may utilize one outcome category (e.g., win, lose, hard number, craps, etc.) to generate via processor 402 gaming options. Predetermined betting structures may utilize more than one outcome category to generate via processor 402 gaming options. Predetermined betting structures may combine any outcome category with any other outcome category to gaming options.

Processor 402 may offer a gaming option which is structured so that the gaming option relates to more than one gaming table. The gaming option structure may be that for the next five baccarat games (e.g., games numbered 1010 to 1014) the dealer will win three of these five games and three of the next five roulette games (e.g., games numbered 900 to 904) red will be the winning spot.

Processor 402 may generate contingent gaming options 108 and/or predetermined gaming options 106. Contingent gaming options 108 may be structures such that when a triggering event occurs over one or more than one gaming event, racing event, and/or sporting event, the wager is activated.

Network interface 422 may allow electronic gaming terminal 400 to communicate with video/multimedia server 215, accounting/transaction server 220, gaming server 225, authentication server 230, player tracking server 235, voucher server 240, and gaming table 260.

Input devices 428 may be mechanical buttons, electronic buttons, a touchscreen, a microphone, cameras, an optical scanner, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming terminal 400, to select a movie or music, to select live video streams (e.g., table 1, table 2, table 3), to request services (e.g., drinks, manager, etc.), or any combination thereof.

Display 426 may show video streams from one or more gaming tables 260, gaming objects from one or more gaming tables 260, computer generated graphics, predetermined gaming options 106, and/or contingent gaming options 108.

Memory 404 may include various memory modules 440. Memory 404 via various memory modules 440 may include a future betting module 406, a predetermined game options module 408, a contingent game options module 410, a confirmation module 412, a validation module 414, a voucher module 416, a reporting module 418, a maintenance module 420, a player tracking preferences module 424, a searching module 430, and an account module 432.

Future betting module 406 may store data relating to the predetermined betting structure. Processor 402 may utilize data in future betting module 406 to generate predetermined gaming options 106 and contingent gaming options 108. Any other processor (e.g., gaming server 225, any virtualized gaming server, etc.) may implement these functions of processor 402.

Predetermined game options module 408 may store data relating to predetermined gaming options 106, which may be offered to a player.

Contingent game options module 410 may store data relating to continent gaming options 108, which may be offered to a player.

Confirmation module 412 may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414 may utilize data received from a voucher to confirm the validity of the voucher.

Voucher module 416 may store data relating to generated vouchers, redeemed vouchers, bought vouchers, and/or sold vouchers.

Reporting module 418 may generate reports related to a performance of electronic gaming terminal 400, electronic gaming system 200, table game 260, video streams, gaming objects, credit device 112, and/or identification device 114.

In one implementation, reporting module 418 may reside on a central server and can aggregate and generate real time statistics on betting activities at one or more table games at one or more participating casino's. The aggregate betting statistics may include trends (e.g., aggregate daily wager volume and wager amount by game types, by casinos, and the like), top games with the most payouts, top tables with the most payouts, top search structures used by players, most popular dealers by wager volume, most searched for game, tables with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten table games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 420 may track any maintenance that is implemented on electronic gaming terminal 400 and/or electronic gaming system 200. Maintenance module 420 may schedule preventative maintenance and/or request a service call based on a device error.

Player tracking preferences module 424 may compile and track data associated with a players preferences.

Searching module 430 may include one or more searching structures, one or more searching algorithms, and/or any other searching mechanisms. The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular table, a particular game, a particular dealer, a particular casino, a particular location within a casino, game outcomes over a time period, payout over a time period, and/or any other criteria. Searching algorithms may be dynamic searching programs, which may be modified based on one or more past results, as described previously.

In another example, the search algorithm may generate a search priority based on the probability of success various events and/or conditions, as described previously. In some embodiments, the search algorithm may utilize any dynamic feedback procedure to enhance current and/or future searching results.

Account module 432 may include data relating to an account balance, a wager limit, a number of wagers placed, credit limits, any other player information, and/or any other account information.

Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

For example, the system and/or device determines via searching function that a triggering event has occurred. Based on this triggering event, the player would like to make a $400 wager, however, the player's account balance is only $50. In this case, the system and/or device may not accept the wager, modify the wager to the account balance (e.g., $50), send a notice to the player, modify the wager to some percentage (e.g., 10%, 25%, 50%, 75%, etc.) of the account balance (e.g., $5, $12.50, $25, $37.5, etc.), send a notice to the gaming entity, make a flat wager (e.g., $10), and/or any combination thereof.

In another example, the system and/or device determines via searching function that a triggering event has occurred. Based on this triggering event, the player would like to make a $400 wager and the player's account balance is $150. However, the system and/or device may not accept the wager because one betting parameter may be that no one wager may be more than a certain percentage (e.g., fifty percent) of a player's account balance. In this case, the system and/or device may not accept the wager, modify the wager to the predetermined limit (e.g., $75), send a notice to the player, modify the wager to some other percentage (e.g., 5%, 10%, 25%, 40%, etc.) of the account balance, send a notice to the gaming entity, make a flat wager (e.g., $10), and/or any combination thereof.

In another example, the gaming jurisdiction, the casino, the system and/or device may not allow an individual to place a wager over a specific value (e.g., $25, $400, $1,000, $10,000, $400,000, $1,000,000, etc.).

In another example, the system and/or device may not allow an individual to lose more than a specific amount of money in a predetermined timeframe. An individual may only be allowed to lose $200 (or any other number) over a two hour period (or any other time period).

In another example, based on this triggering event, the player would like to make a $400 wager and the player has a $200 balance. However, the player has made a predetermined number of wagers within a predetermined time frame. For example, the system and/or device may not allow an individual to make more than 5 wagers a day, 25 wagers a week, 1,000 wagers a year, etc.

Any of these betting parameters may be combined by the system and/or device.

In at least one embodiment, at least a portion of the modules discussed in block diagram 400 may reside locally in gaming terminal 400. However, In at least some embodiments, the functions performed by these modules may be implemented in one or more remote servers. For instance, modules 406-420 and 424 may each be on a remote server, communicating with gaming terminal 400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming terminal 400 would make service requests over the web for the available predetermined wager options to be displayed. Regardless of how the modules and their respective functions are implemented, the interoperability with the gaming terminal 400 is seamless.

In one implementation, reporting module 418 may reside on a central server and can aggregate and generate real time statistics on betting activities at one or more table games at one or more participating casino's. The aggregate betting statistics may include trends (e.g., aggregate daily wager volume and wager amount by game types, by casinos, and the like), top games with the most payouts, top tables with the most payouts, top search structures used by players, most popular dealers by wager volume, most searched for game, tables with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten table games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 5:
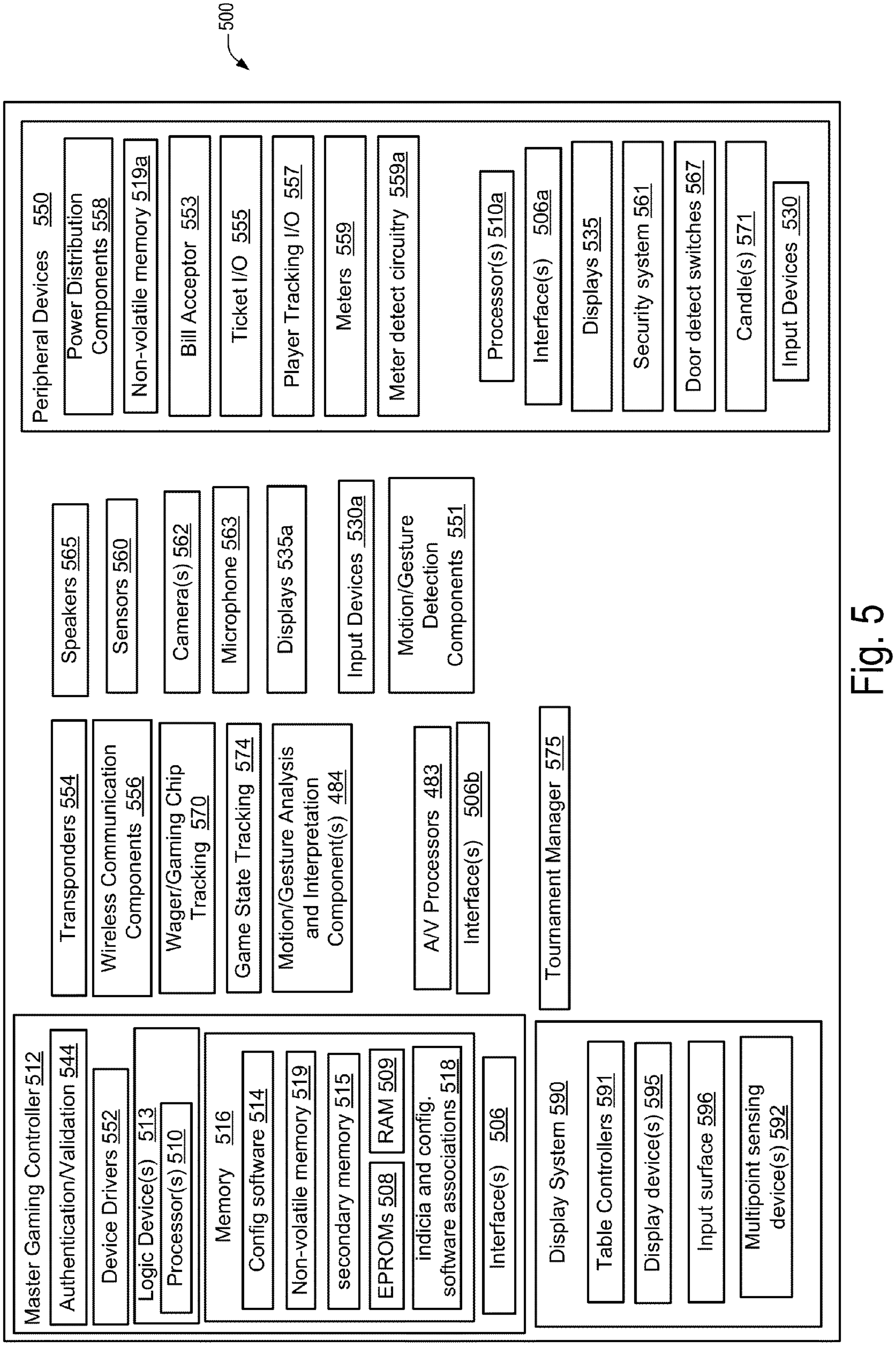
FIG. 5 is a simplified block diagram of an exemplary intelligent multi-player electronic gaming system 500 in accordance with a specific embodiment.

FIG. 5 is a simplified block diagram of an exemplary intelligent multi-player electronic gaming system 500 in accordance with a specific embodiment. In some embodiments, gaming system by hundred may be implemented as a gaming server. In other embodiments, gaming system 500 may be implemented as an electronic gaming machine (EGM) or electronic gaming terminal (EGT).

As illustrated in the embodiment of FIG. 5, gaming system 500 includes at least one processor 510, at least one interface 506, and memory 516. Additionally, as illustrated in the example embodiment of FIG. 5, gaming system 500 includes at least one master gaming controller 512, a multi-touch sensor and display system 590, a plurality of peripheral device components 550, and various other components, devices, systems such as, for example, one or more of the following (or combinations thereof):

- Candle control system 569 which, for example, may include functionality for determining and/or controlling the appearances of one or more candles, etc.;
- Transponders 554;
- Wireless communication components 556;
- Gaming chip/wager token tracking components 570;
- Games state tracking components 574;
- Motion/gesture analysis and interpretation components 584;
- Audio/video processors 583 which, for example, may include functionality for detecting, analyzing and/or managing various types of audio and/or video information relating to various activities at the gaming system;
- Various interfaces 506*b* (e.g., for communicating with other devices, components, systems, etc.);
- Tournament manager 575;
- Sensors 560;
- One or more cameras 562;
- One or more microphones 563;
- Secondary display(s) 535*a;*
- Input devices 530*a;*
- Motion/gesture detection components 551;
- Peripheral Devices 550;

One or more cameras (e.g., 562) may be used to monitor, stream and/or record image content and/or video content relating to persons or objects within each camera's view. For example, in at least one embodiment where the gaming system is implemented as an EGT, camera 562 may be used to generate a live, real-time video feed of a player (or other person) who is currently interacting with the EGT. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include one or more of the following (or combinations thereof):

Table controllers 591;

Multipoint sensing device(s) (e.g., multi-touch surface sensors/components);

Display device(s) 595;

Input/touch surface 596;

Etc.

According to various embodiments, display surface(s) 595 may include one or more display screens utilizing various types of display technologies such as, for example, one or more of the following (or combinations thereof): LCDs (Liquid Crystal Display), Plasma, OLEDs (Organic Light Emitting Display), TOLED (Transparent Organic Light Emitting Display), Flexible (F) OLEDs, Active matrix (AM) OLED, Passive matrix (PM) OLED, Phosphor-escent (PH) OLEDs, SEDs (surface-conduction electron-emitter display), EPD (ElectroPhoretic display), FEDs (Field Emission Displays) and/or other suitable display technology. EPD displays may be provided by E-ink of Cambridge, Mass. OLED displays of the type list above may be provided by Universal Display Corporation, Ewing, N.J.

In at least one embodiment, master gaming controller 512 may include one or more of the following (or combinations thereof):

Authentication/validation components 544;

Device drivers 542;

Logic devices 513, which may include one or more processors 510;

Memory 516, which may include one or more of the following (or combinations thereof): configuration software 514, non-volatile memory 515, EPROMS 508, RAM 509, associations 518 between indicia and configuration software, etc.;

Interfaces 506;

Etc.

In at least one embodiment, Peripheral Devices 550 may include one or more of the following (or combinations thereof):

Power distribution components 558;

Non-volatile memory 519*a* (and/or other types of memory);

Bill acceptor 553;

Ticket I/O 555;

Player tracking I/O 557;

Meters 559 (e.g., hard and/or soft meters);

Meter detect circuitry 559*a;*

Processor(s) 510*a;*

Interface(s) 506*a;*

Display(s) 535;

Independent security system 561;

Door detect switches 567;

Candles, etc. 571;

Input devices 530;

Etc.

In one implementation, processor 510 and master gaming controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 535, input devices 530; etc. For instance, the processor 510 may send messages including game play information to the displays 535 to inform players of cards dealt, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic card readers commercially available for reading a player-specific identification information. The player-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The gaming system may include other types of participant identification mechanisms which may use a fingerprint image, eye blood vessel image reader, or other suitable biological information to confirm identity of the player. Still further it is possible to provide such participant identification information by having the dealer manually code in the information in response to the player indicating his or her code name or real name. Such additional identification could also be used to confirm credit use of a smart card, transponder, and/or player's personal player input device (UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices and I/O devices 511; 5) a secondary memory storage device 515 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers 542 may be stored in memory 516. Example of different types of device drivers may include device drivers for gaming system components, device drivers for gaming system components, etc. Typically, the device drivers 542 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet 575, Firewire, I/O debouncer, direct memory map, serial, PCI, parallel, RF, Bluetooth™ near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; etc.

In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.)

Wireless communication components 556 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication-Interface and Protocol (NFCIP-1)", published by ECMA International (www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 551 may be configured or designed to detect player (e.g., player, dealer, and/or other persons) movements and/or gestures and/or other input data from the player. In some embodiments, each gaming system may have its own respective motion/gesture detection component(s). In other embodiments, motion/gesture detection component(s) 551 may be implemented as a separate sub-system of the gaming system which is not associated with any one specific gaming system or device.

FIG. 6 is a simplified block diagram of an exemplary mobile gaming device 600 in accordance with a specific embodiment. In at least one embodiment, one or more players may participate in a live, multiplayer, wager-based, virtual table game session using mobile gaming devices. In at least some embodiments, the mobile gaming device may be configured or designed to include or provide functionality which is similar to that of an electronic gaming terminal (EGT) such as that described, for example, in FIG. 4.

As illustrated in the example of FIG. 6, mobile gaming device 600 may include a variety of components, modules and/or systems for providing various functionality. For example, as illustrated in FIG. 6, mobile gaming device 600 may include Mobile Device Application components (e.g., 660), which, for example, may include, but are not limited to, one or more of the following (or combinations thereof):

- UI Components 662 such as those illustrated, described, and/or referenced herein.

Database Components 664 such as those illustrated, described, and/or referenced herein.

Processing Components 666 such as those illustrated, described, and/or referenced herein.

Other Components 668 which, for example, may include components for facilitating and/or enabling the mobile gaming device to perform and/or initiate various types of operations, activities, functions such as those described herein.

In at least one embodiment, the mobile gaming device may include Mobile Device App Component(s) which have been configured or designed to provide functionality for enabling or implementing at least a portion of the various live virtual table game techniques at the mobile gaming device.

According to specific embodiments, various aspects, features, and/or functionalities of the mobile gaming device may be performed, implemented and/or initiated by one or more of the following types of systems, components, systems, devices, procedures, processes, etc. (or combinations thereof):

Processor(s) 610
Device Drivers 642
Memory 616
Interface(s) 606
Power Source(s)/Distribution 643
Geolocation module 646
Display(s) 635
I/O Devices 630
Audio/Video devices(s) 639
Peripheral Devices 631
Motion Detection module 640
User Identification/Authentication module 647
Client App Component(s) 660
Other Component(s) 668
UI Component(s) 662
Database Component(s) 664
Processing Component(s) 666
Software/Hardware Authentication/Validation 644
Wireless communication module(s) 645
Information Filtering module(s) 649
Operating mode selection component 648
Speech Processing module 654
Scanner/Camera 652
OCR Processing Engine 656
etc.

Figure 7:
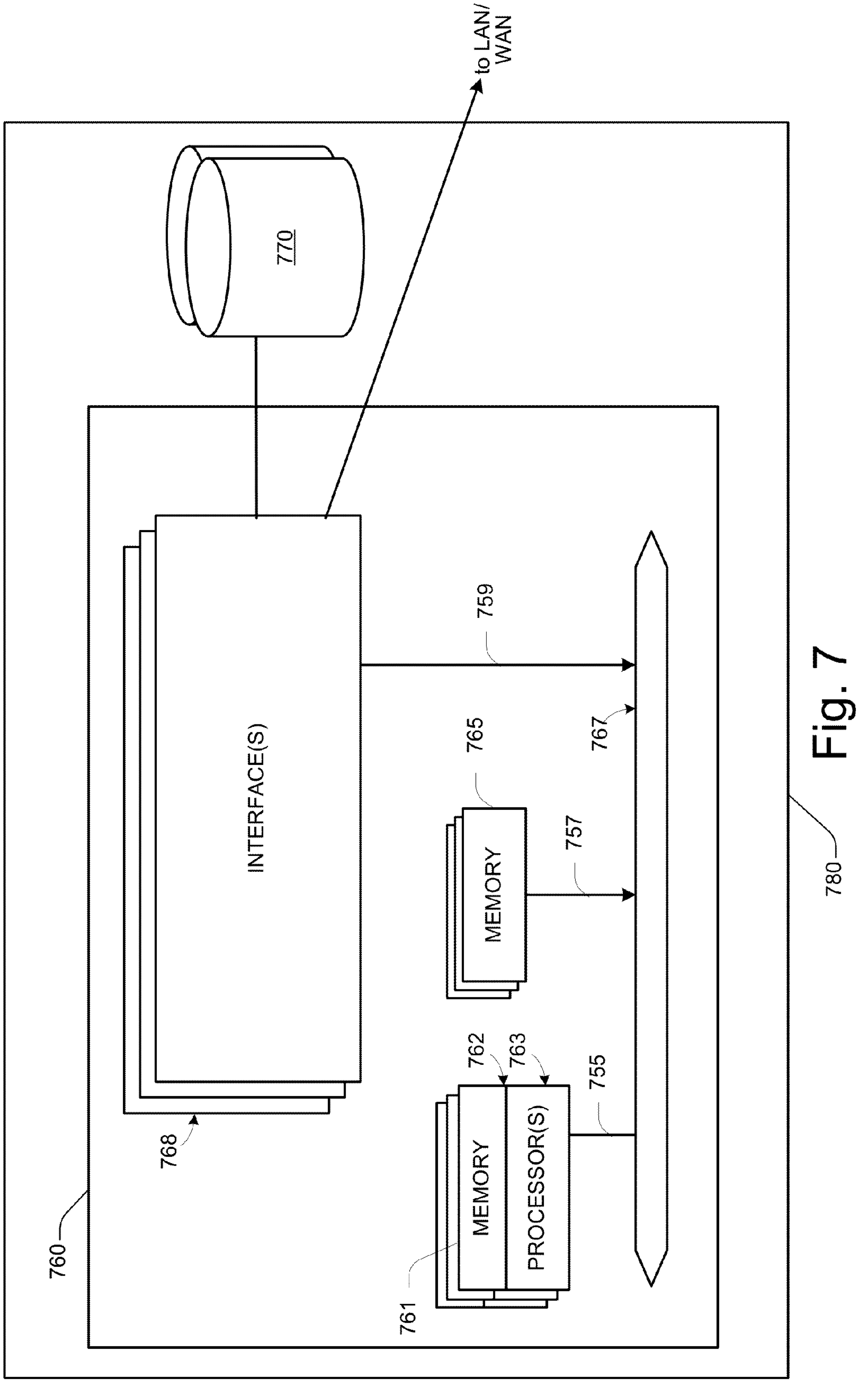
FIG. 7 illustrates an example embodiment of a server system 780 which may be used for implementing various aspects/features described herein.

FIG. 7 illustrates an example embodiment of a server system 780 which may be used for implementing various aspects/features described herein. In at least one embodiment, the server system 780 includes at least one network device 760, and at least one storage device 770 (such as, for example, a direct attached storage device). In one embodiment, server system 780 may be suitable for implementing at least some of the live virtual table game techniques described herein.

In according to one embodiment, network device 760 may include a master central processing unit (CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g. Linux), and any appropriate system software (such as, for example, AppLogic™ software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of server system 780. In a specific embodiment, a memory 761 (such as non-volatile RAM and/or ROM) also forms part of CPU 762. However, there may be many different ways in which memory could be coupled to the system. Memory block 761 may be used for a variety of purposes such as, for example, caching and/or storing data, programming instructions, etc.

The interfaces 768 may be typically provided as interface cards (sometimes referred to as "line cards"). Alternatively, one or more of the interfaces 768 may be provided as on-board interface controllers built into the system motherboard. Generally, they control the sending and receiving of data packets over the network and sometimes support other peripherals used with the server system 780. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

In at least one embodiment, some interfaces may be configured or designed to allow the server system 780 to communicate with other network devices associated with various local area network (LANs) and/or wide area networks (WANs). Other interfaces may be configured or designed to allow network device 760 to communicate with one or more direct attached storage device(s) 770.

Although the system shown in FIG. 7 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 765, which, for example, may include random access memory (RAM)) configured to store data, program instructions for the general-purpose network operations and/or other information relating to the functionality of the various live virtual table game techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
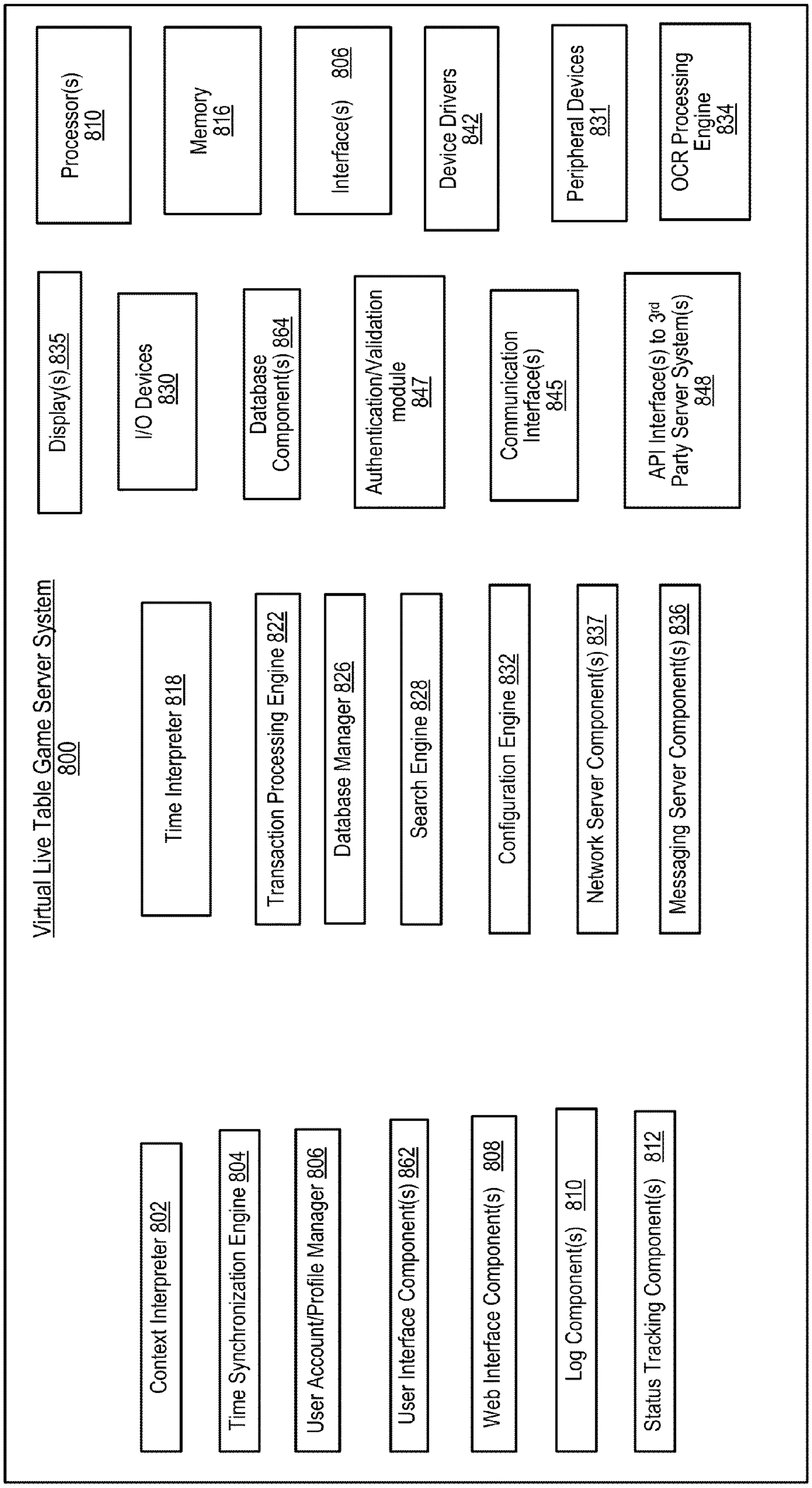
FIG. 8 illustrates an example of a functional block diagram of a Virtual Live game table Server System in accordance with a specific embodiment.

FIG. 8 illustrates an example of a functional block diagram of a Virtual Live game table Server System in accordance with a specific embodiment. In at least one embodiment, the Virtual Live game table Server System may be operable to perform and/or implement various types of functions, operations, actions, and/or other features, such as, for example, one or more of those described and/or referenced herein.

In at least one embodiment, the Virtual Live game table Server System may include a plurality of components operable to perform and/or implement various types of functions, operations, actions, and/or other features such as, for example, one or more of the following (or combinations thereof):

- Context Interpreter (e.g., 802) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):
  - location-based criteria (e.g., geolocation of mobile gaming device, geolocation of EGT, etc.)
  - time-based criteria
  - identity of user(s)
  - user profile information
  - transaction history information
  - recent user activities
  - etc.
- Time Synchronization Engine (e.g., 804) which, for example, may be operable to manages universal time synchronization (e.g., via NTP and/or GPS)
- Search Engine (e.g., 828) which, for example, may be operable to search for transactions, logs, game history information, player information, live virtual table game information, etc., which may be accessed from one or more local and/or remote databases.
- Configuration Engine (e.g., 832) which, for example, may be operable to determine and handle configuration of various customized configuration parameters for one or more devices, component(s), system(s), process(es), etc.
- Time Interpreter (e.g., 818) which, for example, may be operable to automatically and/or dynamically modify or change identifier activation and expiration time(s) based on various criteria such as, for example, time, location, transaction status, etc.
- Authentication/Validation Component(s) (e.g., 847) (password, software/hardware info, SSL certificates) which, for example, may be operable to perform various types of authentication/validation tasks such as one or more of those described and/or referenced herein.
- Transaction Processing Engine (e.g., 822) which, for example, may be operable to handle various types of transaction processing tasks such as, for example, one or more of those described and/or referenced herein.
- OCR Processing Engine (e.g., 834) which, for example, may be operable to perform image processing and optical character recognition of images such as those captured by a gaming device camera, for example.
- Database Manager (e.g., 826) which, for example, may be operable to handle various types of tasks relating to database updating, database management, database access, etc. In at least one embodiment, the Database Manager may be operable to manage game history databases, player tracking databases, etc.
- Log Component(s) (e.g., 810) which, for example, may be operable to generate and manage transactions history logs, system errors, connections from APIs, etc.
- Status Tracking Component(s) (e.g., 812) which, for example, may be operable to automatically and/or dynamically determine, assign, and/or report updated transaction status information based, for example, on the state of the transaction.
- Gateway Component(s) (e.g., 814) which, for example, may be operable to facilitate and manage communications and transactions with external Payment Gateways.
- Web Interface Component(s) (e.g., 808) which, for example, may be operable to facilitate and manage communications and transactions with virtual live game table web portal(s).
- API Interface(s) to Virtual Live game table Server System(s) (e.g., 846) which, for example, may be operable to facilitate and manage communications and transactions with API Interface(s) to Virtual Live game table Server System(s)
- API Interface(s) to 3rd Party Server System(s) (e.g., 848) which, for example, may be operable to facilitate and manage communications and transactions with API Interface(s) to 3rd Party Server System(s)
- At least one processor 810. In at least one embodiment, the processor(s) 810 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of a gaming system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.
- Memory 816, which, for example, may include volatile memory (e.g., RAM), non-volatile memory (e.g., disk memory, FLASH memory, EPROMs, etc.), unalterable memory, and/or other types of memory. In at least one implementation, the memory 816 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile gaming system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein.

Interface(s) 806 which, for example, may include wired interfaces and/or wireless interfaces. In at least one implementation, the interface(s) 806 may include functionality similar to at least a portion of functionality implemented by one or more computer system interfaces such as those described herein and/or generally known to one having ordinary skill in the art.

Device driver(s) 842. In at least one implementation, the device driver(s) 842 may include functionality similar to at least a portion of functionality implemented by one or more computer system driver devices such as those described herein and/or generally known to one having ordinary skill in the art.

One or more display(s) 835.

Messaging Server Component(s) 836, which, for example, may be configured or designed to provide various functions and operations relating to messaging activities and communications.

Network Server Component(s) 837, which, for example, may be configured or designed to provide various functions and operations relating to network server activities and communications.

Etc.

Figure 9:
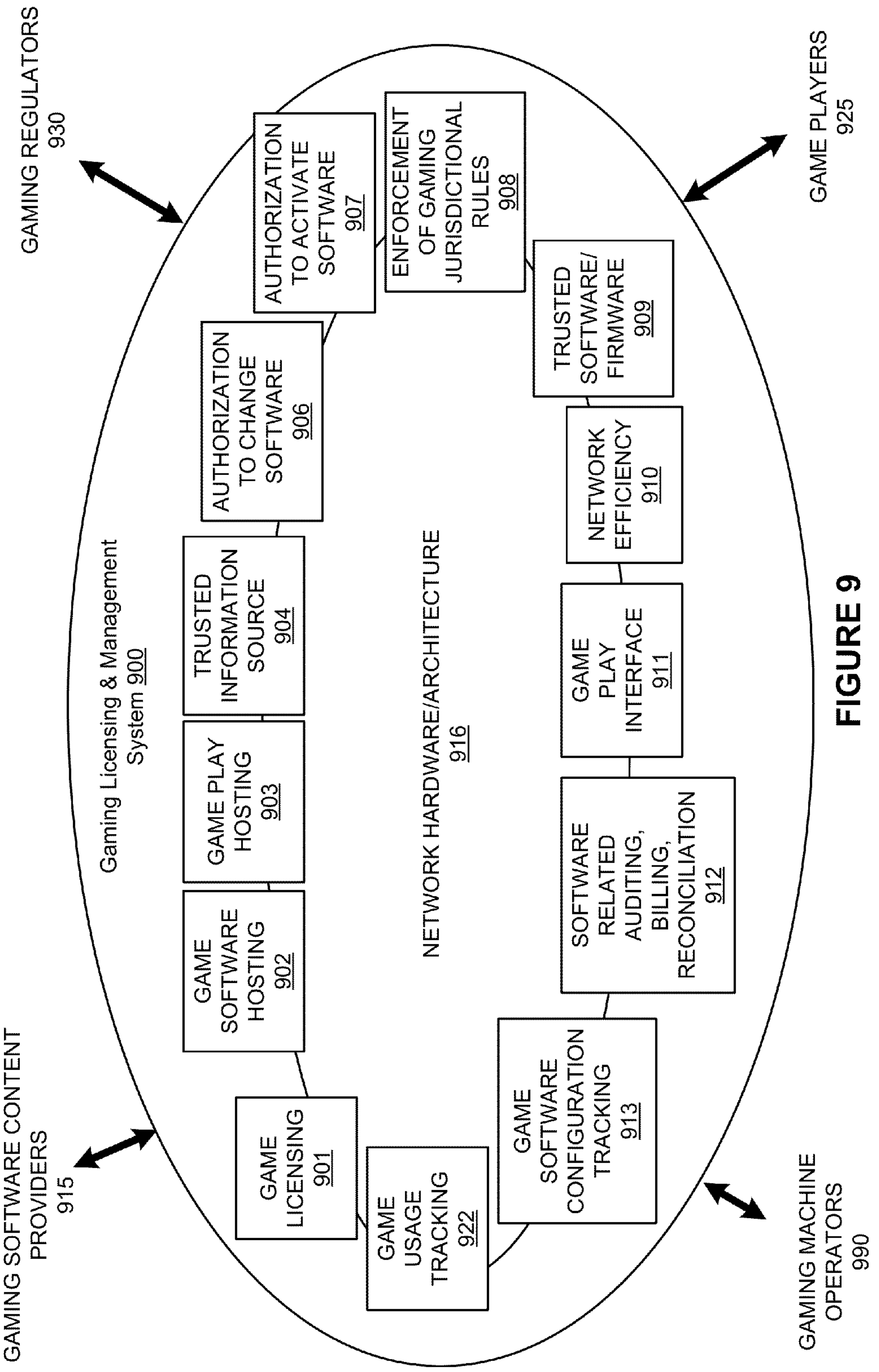
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 9) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min wagers). Details of a game software host and a game software configuration host that may be used with example embodiments are described in co-pending U.S. Pat. No. 6,645,077, by Rowe, titled, "Gaming Terminal Data Repository and Information System," filed Dec. 91, 9000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 9003/0203756, by Jackson, filed on Apr. 95, 9002 and titled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum wager limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In example embodiments, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Figure 10:
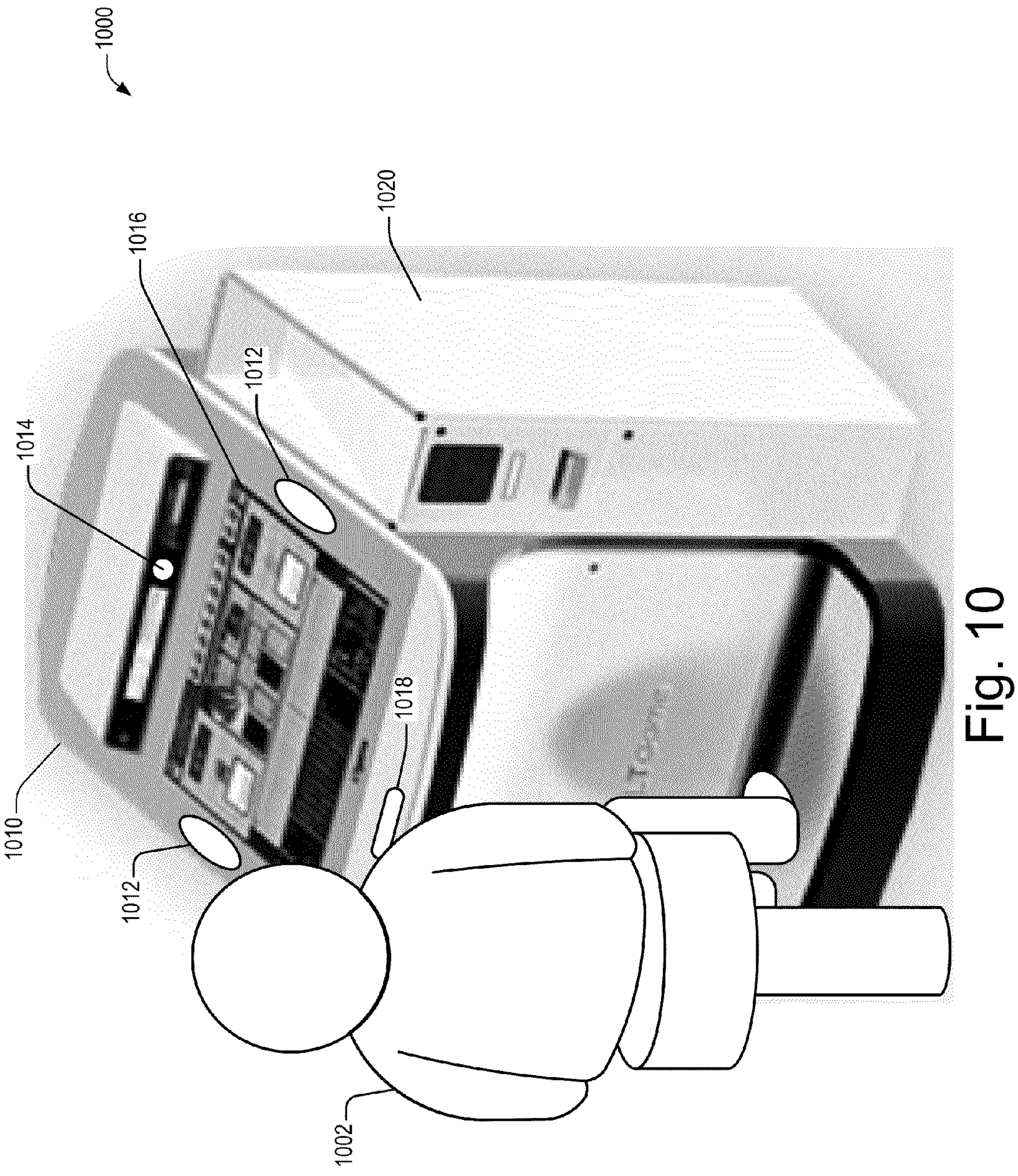
FIG. 10 shows an illustrative example of player interacting with an electronic gaming terminal (EGT), in accordance with a specific embodiment.

FIG. 10 shows an illustrative example of player interacting with an electronic gaming terminal (EGT), in accordance with a specific embodiment. In at least one embodiment, the EGT 1010 may be configured, designed, and/or operable to provide a number of different advantages and/or benefits which are similar to other EGT embodiments described herein, and/or may be operable to initiate, and/or enable various different types of operations, functionalities, and/or features which are similar to other EGT embodiments described herein.

As illustrated in the example embodiment of FIG. 10, a player 1002 is shown seated in front of the EGT 1010. As illustrated, the EGT 1010 may be configured or designed to include one or more of the following (or combinations thereof):

- Primary display screen 1016. In at least one embodiment, the display screen 1016 may be implemented as a touch display screen which is capable of receiving user input via user contact with the display screen.
- Speakers 1012. In at least one embodiment, the speakers 1012 may be used to provide audio information to the player or person 1002 interacting with the EGT. Examples of different types of audio information may include, for example, audio instructions and/or other audio/verbal communications from one or more remote players and/or from a remote live game table dealer/attendant, computer-generated audio instructions/content, sound effects, and/or other types of audio content.
- Microphone 1018. In at least one embodiment, microphone 1018 may be used to capture, record, and/or stream audio or vocal information from the electronic gaming table region, which, for example, may include verbal communications from the player 1002.
- Camera 1014. In at least one embodiment, camera 1014 may be used to monitor, stream and/or record image content and/or video content relating to persons or objects within the camera's view. For example, camera 1014 may be used to generate a live, real-time video feed of player 1002 as the player interacts with the EGT. In some embodiments, camera 1014 may be used to verify a user's identity (e.g., by authenticating detected facial features), and/or may be used to monitor or tract facial expressions and/or eye movements of a user or player who is interacting with the gaming system.
- Peripheral components 1020.

and/or other components/features described herein.

In at least one embodiment, player 1002 may use the EGT 1010 to participate in one or more live, multiplayer, wager-based, virtual table game sessions. In at least some embodiments, the virtual table game sessions may include streamed video or video+audio feed of the other remote player(s) participating in those gaming sessions (e.g., who are also participating in the gaming sessions via their respective EGTs). The audio/video feed(s) for a given player participant may be captured by the camera and microphone of that player's EGT. In this way, the EGT provides functionality for enabling the players of a given gaming session to converse with each other during game play, and may also provide functionality for enabling players to view the facial expressions and behaviors of other players during game play (which, for example, may be advantageously used in bluffing type games such as poker).

In some embodiments, players may be prevented from viewing the other participating players, and/or prevented from knowing the identity of the other players in a given live virtual table game session. For example, in one embodiment, the system may assign a random player name to each respective player at the commencement of each new gaming session or round of play in order to prevent or discourage cheating among colluding players.

The following example is intended to help illustrate some of the various types of functions, operations, actions, and/or other features which may be provided by the live virtual table game techniques described herein.

Example Scenario A

A casino patron desires to engage in a live, multiplayer, wager-based, virtual table poker game, and sits down at an electronic game terminal which is located in a gaming area of the casino. The player swipes his player card (or inserts an amount of cash or credit voucher), then proceeds to select a game to play. The player selects a multiplayer Poker game option, with a live dealer, and a $5 minimum bet. All available live tables meeting the player's preferences are displayed at the EGT. The player selects one live table via interaction with the EGTs touchscreen display. The game server constructs a virtual table, and streams the "live" video feed of the selected live table to the player EGT. The virtual table includes a display of a live video feed of the live dealer who is conducting the game play at the live table. In some embodiments, the virtual table includes a live video or video+audio feed of the other remote players to be participating in the poker game session at the virtual table. In at least one embodiment, each of the players may be participating remotely from their respective EGT (or other suitable gaming machine). In at least one embodiment, the player's EGT shows that there are other anonymous players occupying seats at the virtual table. In one embodiment, the virtual table GUI may be presented at the player's EGT display for enabling the player to use a virtual camera to observe (e.g., by panning/zooming) the virtual table and to observe representations of the remote players who are occupying seats at the virtual table. The player may also be presented with additional information relating to the virtual table game rules such as, for example: min/max wagers, game type, total number of decks/cards to be used in game play, previous game history relating to that specific live game table, paytables, game rules, etc. In at least one embodiment, if the player elects to participate in game play at the selected virtual table, the player is given an opportunity to choose an open seat at the virtual table. In one embodiment, the live virtual table game session commences when the system determines that are a sufficient number of players to start the active game session. In other embodiments, the live virtual table game session may commence at a predetermined time, or upon the expiration of a predetermined time interval (e.g., game play will start in 60 seconds).

FIGS. 11A-13B illustrate different example embodiments of how content and information relating to one or more live, multiplayer, wager-based, virtual table games may be presented on the display screen of a player's EGT (or other casino gaming machine).

Figure 11A:
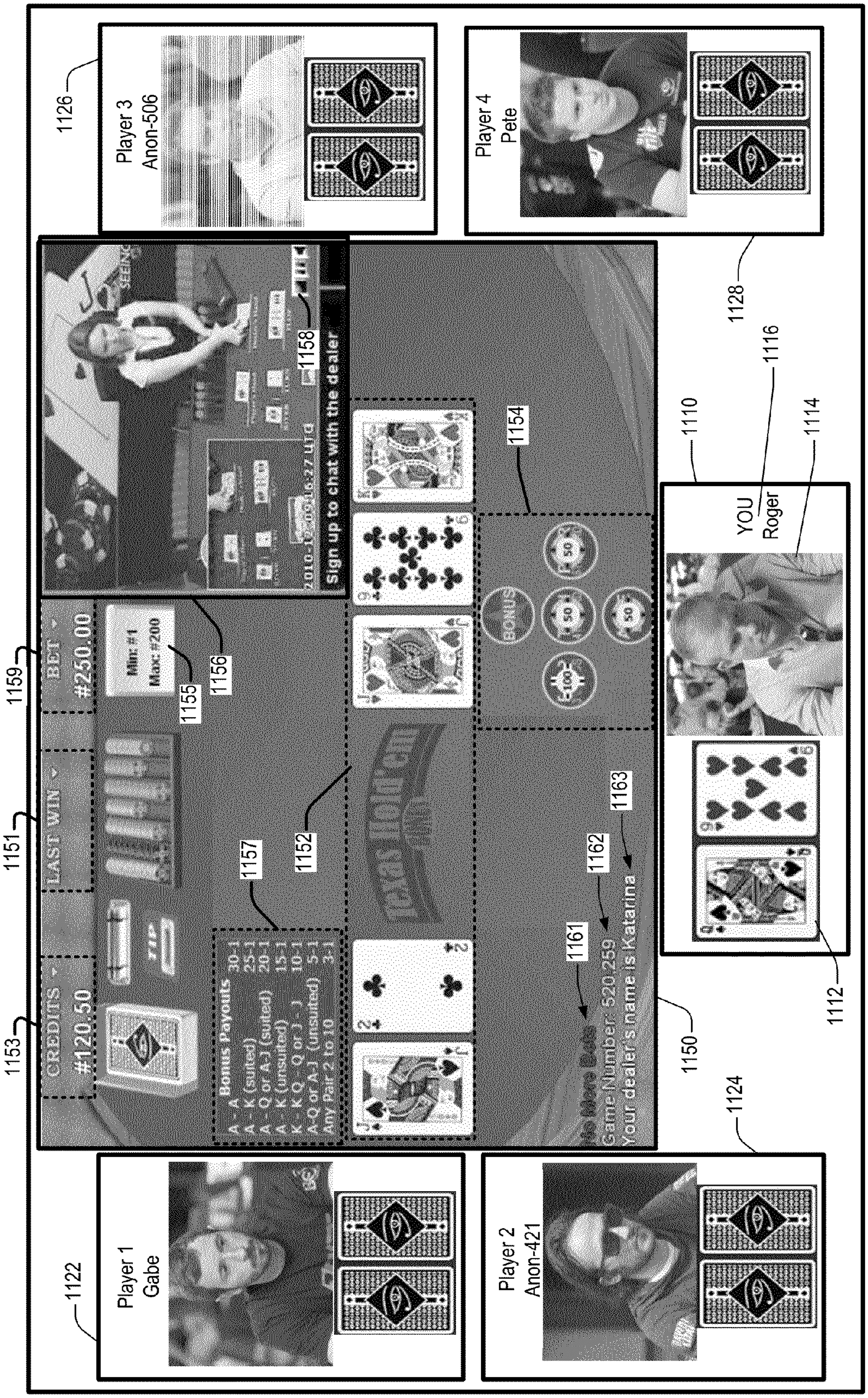
FIGS. 11A-13B illustrate different example embodiments of how content and information relating to one or more live, multiplayer, wager-based, virtual table games may be presented on the display screen of a player's EGT (or other casino gaming machine).

FIG. 11A shows one example embodiment of a live virtual game session display GUI 1100. In the specific example embodiment of FIG. 11A, it is assumed that 5 players at remote EGTs are engaged in live virtual poker table game session. In this particular embodiment, it is assumed that the specific version of poker game being played is Texas Hold'em.

As illustrated in the example virtual game table display GUI 1100 of FIG. 11A, representations of the five different players who are participating in the live virtual poker table game session are shown via player panel GUIs 1122, 1124, 1126, 1128, and 1110. In at least one embodiment, it is assumed that each of the players is remotely participating in the live virtual poker table gaming session via a respective EGT.

In at least one embodiment, each EGT is physically located in an approved gaming area of one or more real-world casino venue. By deploying the EGTs within the casino gaming area, real-world casino venues are able to securely and legally provide opportunities for their players/patrons to participate in live, competitive, wager-based card games and wager-based table games where players from the same and/or different casinos are able to compete against one another in live, multiplayer, virtual game table environments. In at least one embodiment, players can be located at the same and/or at remote casino venues that are connected via a wide area network such as the Internet, cellular networks, VPNs, cloud-based networks, etc.

In at least one embodiment, the live, multiplayer, wager-based, virtual table games use live game tables and live dealers/attendants for conducting the live, multiplayer, wager-based, virtual table games. In at least some embodiments, each of the EGTs is remotely located from the live game table dealer/attendant. Examples of various types of live virtual table games which may be played may include, but are not limited to, one or more of the following (or combinations thereof): "Heads Up" type card games (e.g., where players compete either 1-on-1 or player vs. casino/house/computer opponent); poker, Blackjack, Baccarat, Mahjong, Dou DI Zhu 斗地主, chess-type games, etc.

In at least one embodiment, the live virtual table game sessions may be remotely conducted using physical playing cards and/or using physical or live game table equipment (e.g., physical dice, live roulette wheels, etc.). In at least some embodiments, the randomness of card distribution to players participating in a live virtual table game session is achieved via live shuffling of physical cards at the live game table, and is not implemented using computerized random number generation (RNG). The live game table may include an electronic shuffler which is configured or designed to automatically shuffle multiple decks of cards, and to track the relative order of each of the cards of the shuffled decks of cards. The live dealer may use the electronic shuffler to shuffle the decks of cards before dealing the required hands, and may place the shuffled decks of cards into the electronic shoe prior to dealing. In this way, the system may know at all times the relative order of all cards in the card shoe, and may therefore accurately determine card distributions to the participating players based on the known ordering of the cards in the electronic shoe. Similarly, in at least some embodiments, the game data (e.g., cards dealt, dice rolls, roulette wheel spin/ball landing, etc.) are generated by activities performed by a live game table dealer or attendant.

Alternatively, in other embodiments, the randomness of card distribution to players participating in a live virtual table game session is achieved using computerized random number generation (RNG) (e.g., via RNG-based virtual dealer operated by a game server). Similarly, in some embodiments, at least a portion of the game data (e.g., cards dealt, dice rolls, roulette wheel spin/ball landing, etc.) may be generated using computerized RNG techniques.

As illustrated in the example embodiment of FIG. 11A, player panel GUIs 1122, 1124, 1126, 1128, and 1110 are positioned around a virtual game table GUI 1150. In at least one embodiment, the relative positions of the player panel GUIs (e.g., relative to the virtual game table GUI 1150) may be used to represent the relative seating positions of each player at the virtual game table.

As illustrated in the example embodiment of FIG. 11A, virtual game table GUI 1150 may be configured or designed to dynamically display a variety of different content relating to the current poker game play being conducted at the live poker game table. Examples of such content may include, but are not limited to, one or more of the following (or combinations thereof):

Community cards 1152.

Min/Max wager limits 1155.

Game type (e.g., Texas Hold'em).

Number of decks/cards used in game play.

Paytables and/or bonus payouts 1157.

- Amount of chips, credits, or currency currently held by each (or selected) player(s) at the virtual game table (e.g., 1153).
- Current total pot amount (e.g., 1159).
- Raise/Ante amounts.
- Prior wins/payouts 1151.
- Wagering GUI 1154 which, for example, may be configured or designed to enable a player to input wager/ante amounts.
- Player input GUI, which, for example, may be configured or designed to enable a player to input game play instructions (e.g., roll dice, hit me, stand, fold, draw card, etc.).
- Game rules.
- Live, real-time video feed 1156 of live game table and live dealer attendant where live game play is being conducted.
- Video feed control GUI 1158, which, for example, may be configured or designed to enable a player to control playback (e.g., pause, replay, mute, resume, etc.) of the live game table video feed.
- Timestamp information.
- Table ID information.
- Game Session ID information 1162.
- Prior and/or current game state (or game activity) information 1161 (e.g., "no more bets", "Player 2's turn", "Player 1 called", "Player 3 folded", "Dealer hits; receives 10 of clubs", "Dealer busts", etc.).
- Communication GUI, which, for example, may be configured or designed to enable communications (e.g., voice, text, chat, etc.) between a given player and the live dealer/attendant.
- Dealer ID information 1163.
- Game play tips.
- Timer information such as, for example, amount of time player has remaining to input game play instructions and/or wager amount.
- Cards (e.g., 1206, FIG. 12A) dealt to the dealer or house (e.g., visible if dealt face up, obscured if dealt face down).
- Other types of information/content described and/or referenced herein.

In the specific example embodiment of FIG. 11A, it is assumed that the virtual game table display GUI 1100 is presented on the EGT display corresponding to a player identified as "Roger". As illustrated in the example embodiment of FIG. 11A, Roger's personalized game play information is displayed in player panel GUI 1110. In at least one embodiment, the personalized game play information displayed in player panel GUI 1110 may include, for example, one or more of the following (or combinations thereof):

- Cards 1112 which have been dealt only to the identified player (e.g., Roger).
- Player ID information 1116 (e.g., Player ID=Roger).
- A visual representation 1114 of the player such as, for example: an avatar, a graphic, an image or photo, a live video feed of the player, a text representation of the player, etc.
- Amount of chips, credits, or currency currently held by the identified player.
- Timer information such as, for example, amount of time player has remaining to input game play instructions and/or wager amount.
- Wager and/or Ante amounts required to continue participating in current game play session.
- Other types of information/content described and/or referenced herein.

As illustrated in the example embodiment of FIG. 11A, the other player panel GUIs (e.g., 1122, 1124, 1126, 1128) may include, for example, one or more of the following (or combinations thereof):

- Cards which have been dealt "face up" to the identified player (e.g., cards held by the player which are intended to be viewed by all players at the virtual game table).
- Player name and/or Player ID information.
- A visual representation of the player such as, for example: an avatar, a graphic, an image or photo, a live video feed of the player, a text representation of the player, etc.
- Amount of chips, credits, or currency currently held by the identified player.
- Other types of information/content described and/or referenced herein which may be associated with or related to the identified player.

In the specific example embodiment of FIG. 11A, it is assumed that each player of the live, multiplayer, wager-based, virtual table game is presented with a streamed video (or streamed video+audio) feed of the other player participating in live virtual poker game table. In at least one embodiment, a player's EGT may include a built in camera, microphone and/or speakers for enabling the players of a given gaming session to converse with each other during game play, and to view the facial expressions and behaviors of other players during game play (which, for example, may be advantageously used in bluffing type games such as poker).

In other embodiments, players may be prevented from viewing the other players. For example, in one embodiment, the system may assign a random player name to each respective player at the commencement of each new gaming session or round of play in order to prevent or discourage cheating among colluding players.

Another advantageous aspect of the virtual game table techniques described herein relates to the ability for the gaming network to enable multiple different live virtual table game sessions (involving different groups of players in each of the different live virtual table game sessions) to be conducted using the same, shared live game table dealer/attendant. An example of this feature is illustrated in FIG. 11B.

Figure 11B:
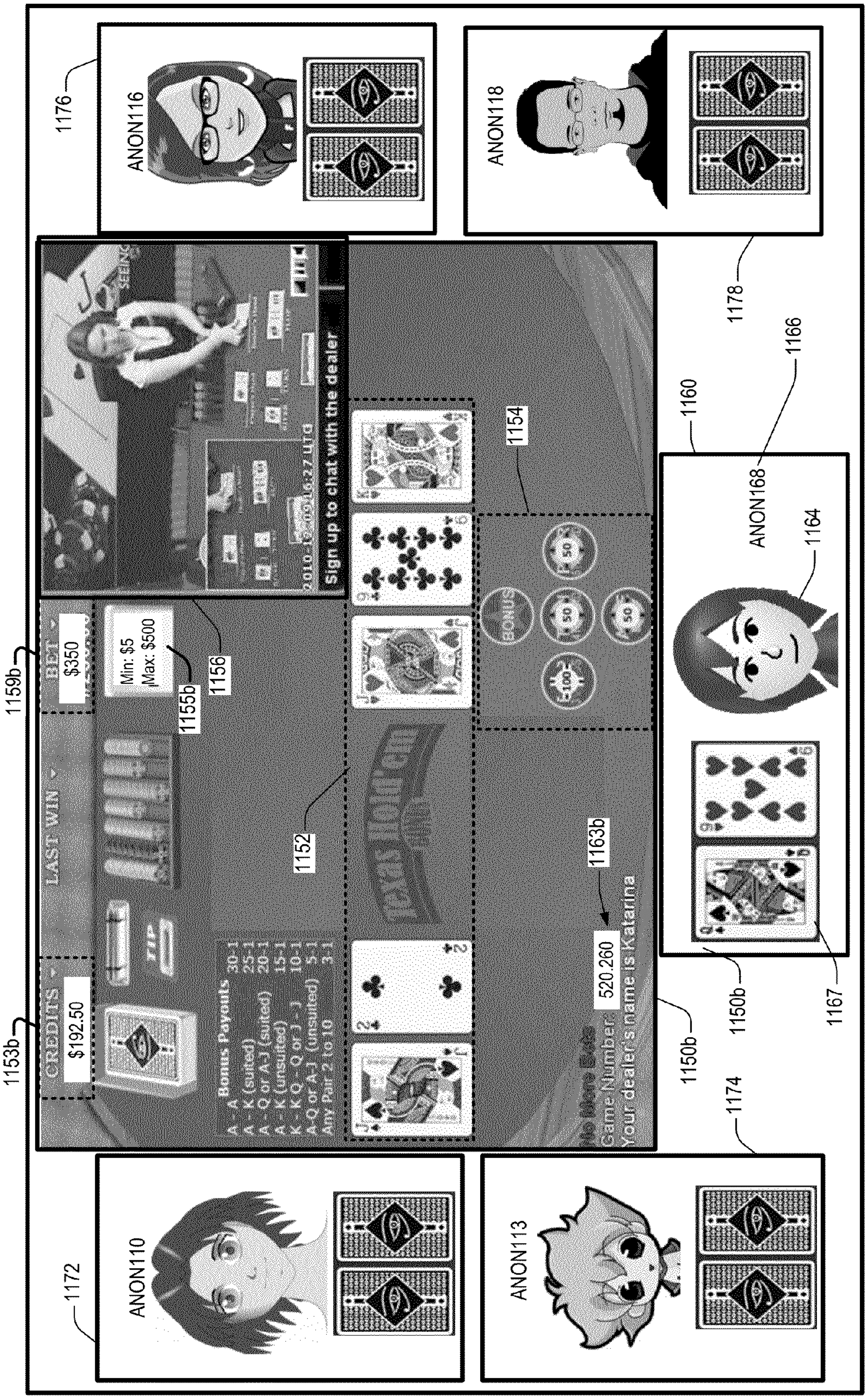

FIG. 11B shows an example embodiment of a live virtual game session display GUI 1190. In the specific example embodiment of FIG. 11B, it is assumed that new 5 players (different from the 5 players represented in FIG. 11A) are simultaneously or concurrently participating (e.g., via their respective EGTs) in the live virtual poker table game being conducted at the same live game table and same live dealer as that illustrated in FIG. 11A.

Thus, for example, in at least one embodiment, a single live game table (e.g., as shown at 1156 of FIGS. 11A and 11B) may be used to concurrently or simultaneously host multiple different virtual game table sessions, wherein each virtual game table session is participated in by a respectively different group of players. In at least one embodiment, game play in each of the different virtual game table sessions may be conducted independently from each of the other virtual game table sessions. In at least some embodiments, the players participating in one of the virtual game table sessions may not even be aware of the existence of the other concurrently active virtual game table sessions which are utilizing the same live game table and live dealer/attendant.

For example, as illustrated in the example virtual game table display GUI 1190 of FIG. 11B, representations of the five different players who are participating in the live virtual poker table game session are shown via player panel GUIs 1172, 1174, 1176, 1178, and 1160. In at least one embodiment, it is assumed that each of the players is remotely participating in the live virtual poker table gaming session via a respective EGT. Player panel GUIs 1172, 1174, 1176, 1178, and 1160 are positioned around a virtual game table GUI 1150*b*. In at least one embodiment, the relative positions of the player panel GUIs (e.g., relative to the virtual game table GUI 1150*b*) may be used to represent the relative seating positions of each player at the virtual game table.

As illustrated in the example embodiment of FIG. 11B, the identity of the players which are participating in the live virtual poker table game session of FIG. 11B are different from those of FIG. 11A. Additionally, in the specific example embodiment of FIG. 11B, the system has assigned a random player name to each respective player, and the visual representation of each player utilizes avatars instead of live video feeds of the players.

In the specific example embodiment of FIG. 11B, the live virtual poker table game session corresponds to a separate poker gaming session (e.g., corresponding to gaming session ID 520.260) which is different from the poker gaming session of FIG. 11A (e.g., corresponding to gaming session ID 520.259). In the examples of FIGS. 11A and 11B, both poker gaming sessions are being played concurrently and independently by the respective group of players at each virtual poker table 1150, 1150*b*. Additionally both poker gaming sessions are being played concurrently and independently using the same live poker game table, the same live dealer, and the same live game table video feed 1156. As a result, in at least one embodiment, the card distributions in each of the separate gaming sessions may be identical to each other, until a condition or event occurs which causes the card distributions in each of the gaming sessions to diverge from one another.

Although both poker gaming sessions are being played concurrently and independently using the same live game table, the same live dealer, and the same live game table video feed 1156, it is possible for other aspects of each gaming session to differ from one another while still allowing both gaming sessions to use the same live game table, the same live dealer, and the same live game table video feed. Examples of at least some gaming session aspects which may be permitted to differ from one another may include, but are not limited to, one or more of the following (or combinations thereof):

- Min/Max wager limits.
- Paytables and/or bonus payouts.
- Current total pot amount.
- Raise/Ante amounts.
- Prior wins/payouts.
- Player wagers.
- Game Session ID information.
- Content displayed in the virtual game table GUI (other than the live game table video feed 1156)
- Content displayed in other portions of the live virtual game session display GUI.

FIGS. 12A-13B illustrate additional example embodiments of how content and information relating to one or more live, multiplayer, wager-based, virtual table games may be presented on the display screen of a player's EGT (or other casino gaming machine).

Figure 12A:
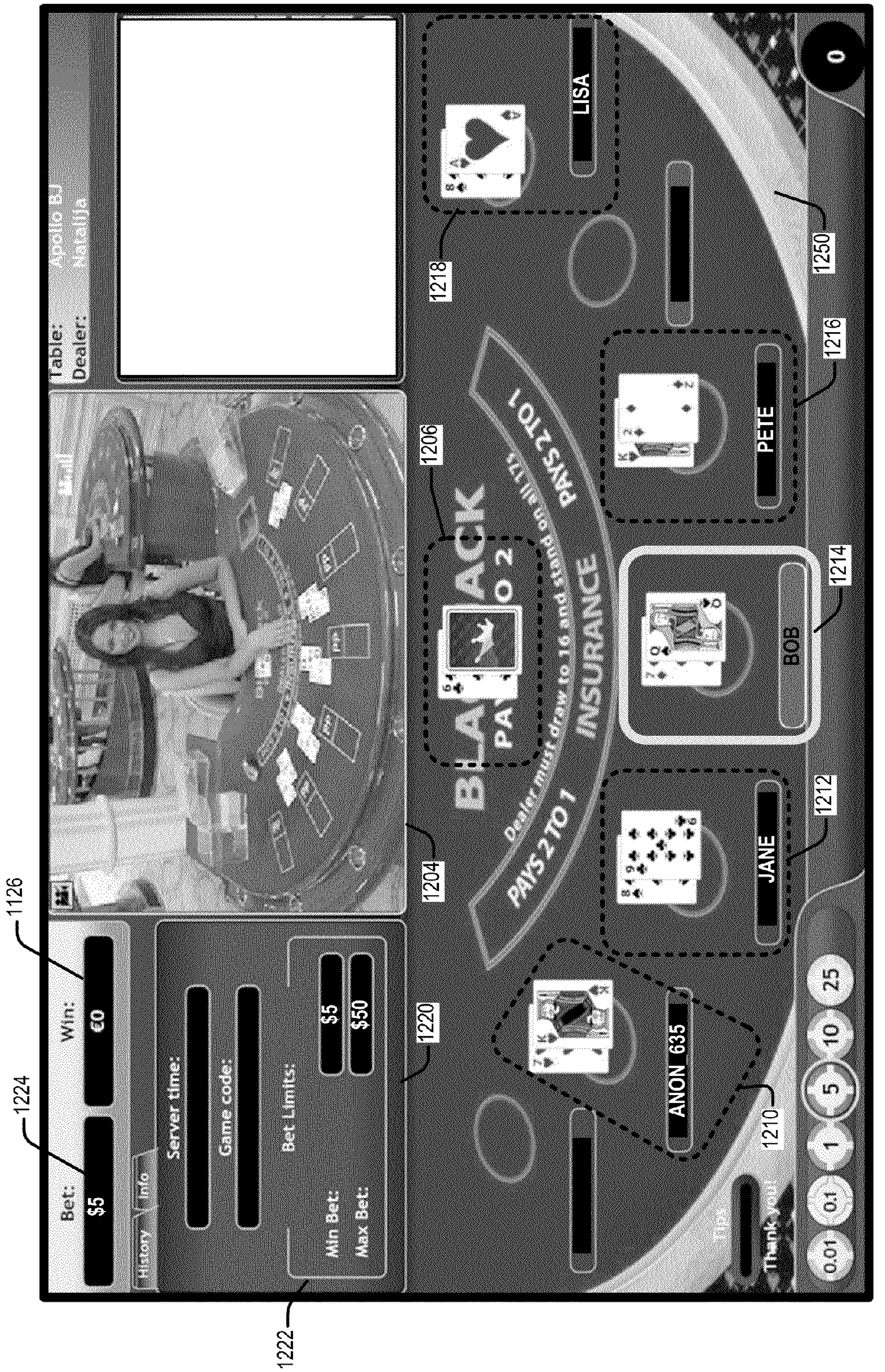

FIG. 12A shows one example embodiment of a live virtual game session display GUI 1200. In the specific example embodiment of FIG. 12A, it is assumed that 5 players at remote EGTs are engaged in live virtual blackjack table game session. As illustrated in the example virtual game table display GUI 1200 of FIG. 12A, representations of the five different players who are participating in the live virtual blackjack table game session are indicated by player regions 1210, 1212, 1214, 1216, 1218. In at least one embodiment, it is assumed that each of the players is remotely participating in the live virtual blackjack table gaming session via a respective EGT. As illustrated in the example embodiment of FIG. 12A, player regions 1210, 1212, 1214, 1216, 1218 are positioned around a virtual game table 1250. In at least one embodiment, the relative positions of the player regions at the virtual game table 1250 may represent the relative seating positions of each player at the virtual game table. In the specific example embodiment of FIG. 12A, several seating positions are shown as being unoccupied by players. These represent open seats at the virtual blackjack table, which may be subsequently occupied if additional remote players joining the live virtual blackjack table game (e.g., in a manner similar to that which takes place at live casino blackjack game tables).

As illustrated in the example embodiment of FIG. 12A, virtual game session display GUI 1200 may be configured or designed to dynamically display a variety of different content relating to the current blackjack game play being conducted at a live blackjack game table (as illustrated in the live game table video feed portion 1204. Examples of such content may include, but are not limited to, one or more of the various types of content and/or information described previously with respect to the virtual game session display GUI of FIG. 11A.

In the specific example embodiment of FIG. 12A, it is assumed that the virtual game table display GUI 1200 is presented on the EGT display corresponding to a player identified as "BOB", which, in this example is highlighted by a thick yellow border around player region 1214. As illustrated in the example embodiment of FIG. 12A, BOB's personalized game play information is displayed in player region 1214. In at least one embodiment, the personalized game play information displayed in player region 1214 may include, for example, one or more of the various types of content and/or information described previously with respect to the player panel GUI(s) of FIG. 11A. In at least one embodiment, the other player regions (e.g., 1210, 1212, 1216, 1218) may also include one or more of the various types of content and/or information described previously with respect to the player panel GUI(s) of FIG. 11A.

As discussed previously, the gaming network may be configured or designed to enable multiple different live virtual table game sessions (involving different groups of players in each of the different live virtual table game sessions) to be conducted using the same, shared live game table dealer/attendant. Illustrative examples of this technique have been described previously with respect to FIGS. 11A and 11B. Additional illustrative examples of this technique are described below with respect to FIGS. 12A, 12B, 13A, 13B.

Figure 12B:
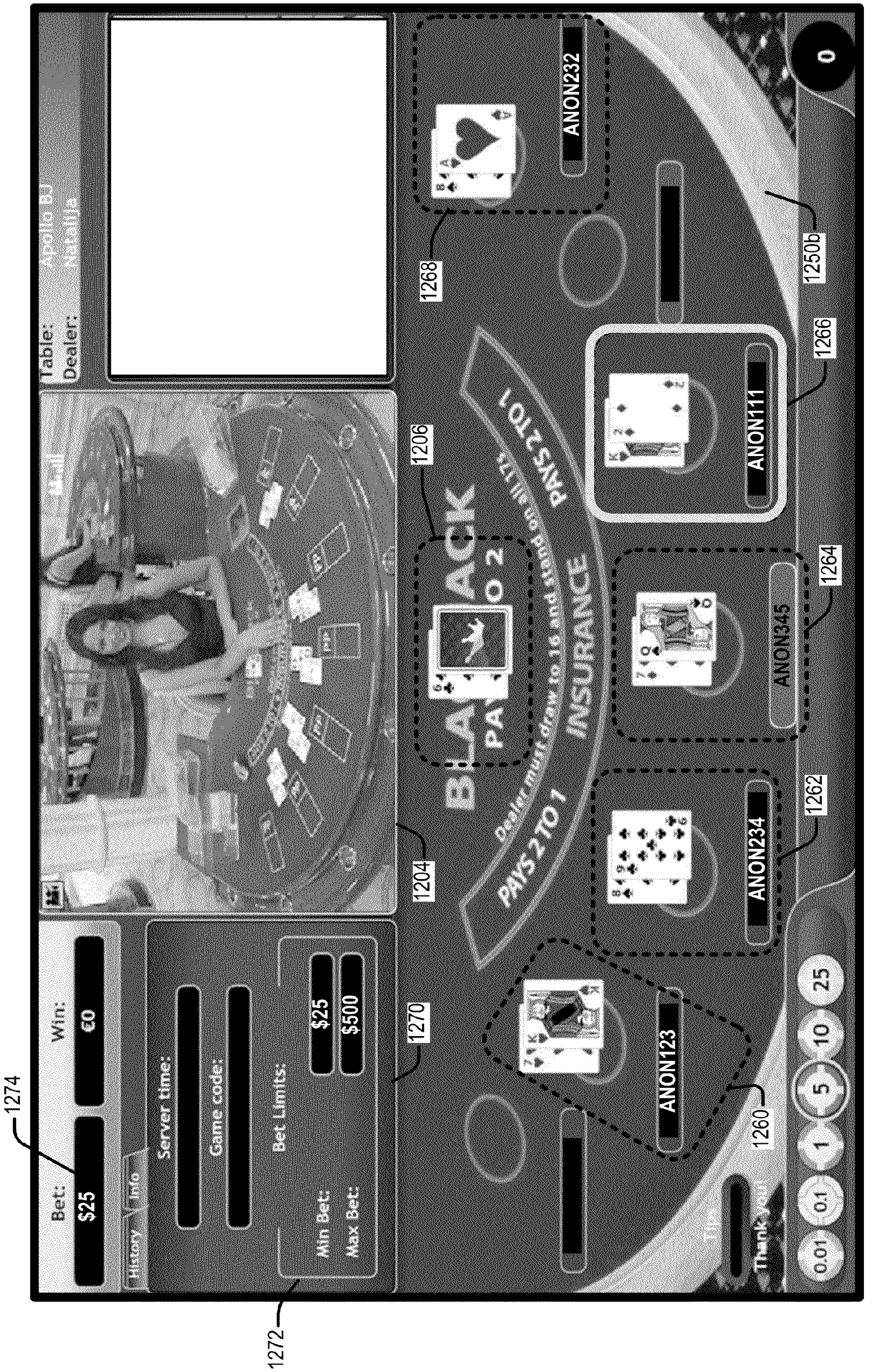

FIG. 12B shows an example embodiment of a live virtual game session display GUI 1290. In the specific example embodiment of FIG. 12B, it is assumed that new 5 players (different from the 5 players represented in FIG. 12A) are simultaneously or concurrently participating (e.g., via their respective EGTs) in the live virtual blackjack table game being conducted at the same live game table and same live dealer as that illustrated in FIG. 12A.

For example, in the example embodiments illustrated in FIGS. 12A and 12B, a live blackjack game table (e.g., as shown at 1204 of FIGS. 12A and 12B) may be used to concurrently or simultaneously host multiple different virtual game table sessions, wherein each virtual game table session is participated in by a respectively different group of players. In at least one embodiment, game play in each of the different virtual game table sessions may be conducted independently from each of the other virtual game table sessions. For example, as illustrated in the example virtual game table display GUI 1290 of FIG. 12B, representations of the five different players who are participating in the live virtual blackjack table game session are shown via player regions 1260, 1262, 1264, 1266, 1268. In at least one embodiment, it is assumed that each of the players is remotely participating in the live virtual blackjack table gaming session via a respective EGT. Player regions 1260, 1262, 1264, 1266, 1268 are positioned around a virtual game table 1250*b*. In at least one embodiment, the relative positions of the player regions (e.g., relative to the virtual game table 1250*b*) may represent the relative seating positions of each player at the virtual game table.

As illustrated in the example embodiment of FIG. 12B, the identity of the players which are participating in the live virtual blackjack table game session of FIG. 12B are different from those of FIG. 12A. Additionally, in the specific example embodiment of FIG. 12B, the system has assigned a random player name to each respective player, and no visual representation of the players is presented.

In the specific example embodiment of FIG. 12B, it is assumed that the virtual game table display GUI 1200 is presented on the EGT display corresponding to a player identified as "ANON111", which, in this example is highlighted by a thick yellow border around player region 1266. As illustrated in the example embodiment of FIG. 12B.

In the specific example embodiment of FIG. 12B, the live virtual blackjack table game session corresponds to a separate blackjack gaming session which is different from the blackjack gaming session of FIG. 12A. In the examples of FIGS. 12A and 12B, both blackjack gaming sessions are being played concurrently and independently by each the respective group of players at each virtual blackjack table 1250 and 1250*b*. Additionally both blackjack gaming sessions are being played concurrently and independently using the same live blackjack game table, the same live dealer, and the same live game table video feed 1204. As a result, in at least one embodiment, the card distributions in each of the separate gaming sessions may be identical to each other, until a condition or event occurs which may cause the card distributions in each of the gaming sessions to diverge from one another such as, for example, one or more of the following (or combinations thereof):

- One or more new players join the game at one of the live virtual blackjack tables.
- One or more existing players leave the game at one of the live virtual blackjack tables.
- One or more existing players at one of the live virtual blackjack tables makes a game play decision which affects the distribution of the cards which are subsequently dealt out in that game, and which results in a divergence of the card distributions to the different groups of players in each of the respective live virtual table game sessions. An example of such a scenario is illustrated in FIGS. 13A and 13B.

Figure 13A:
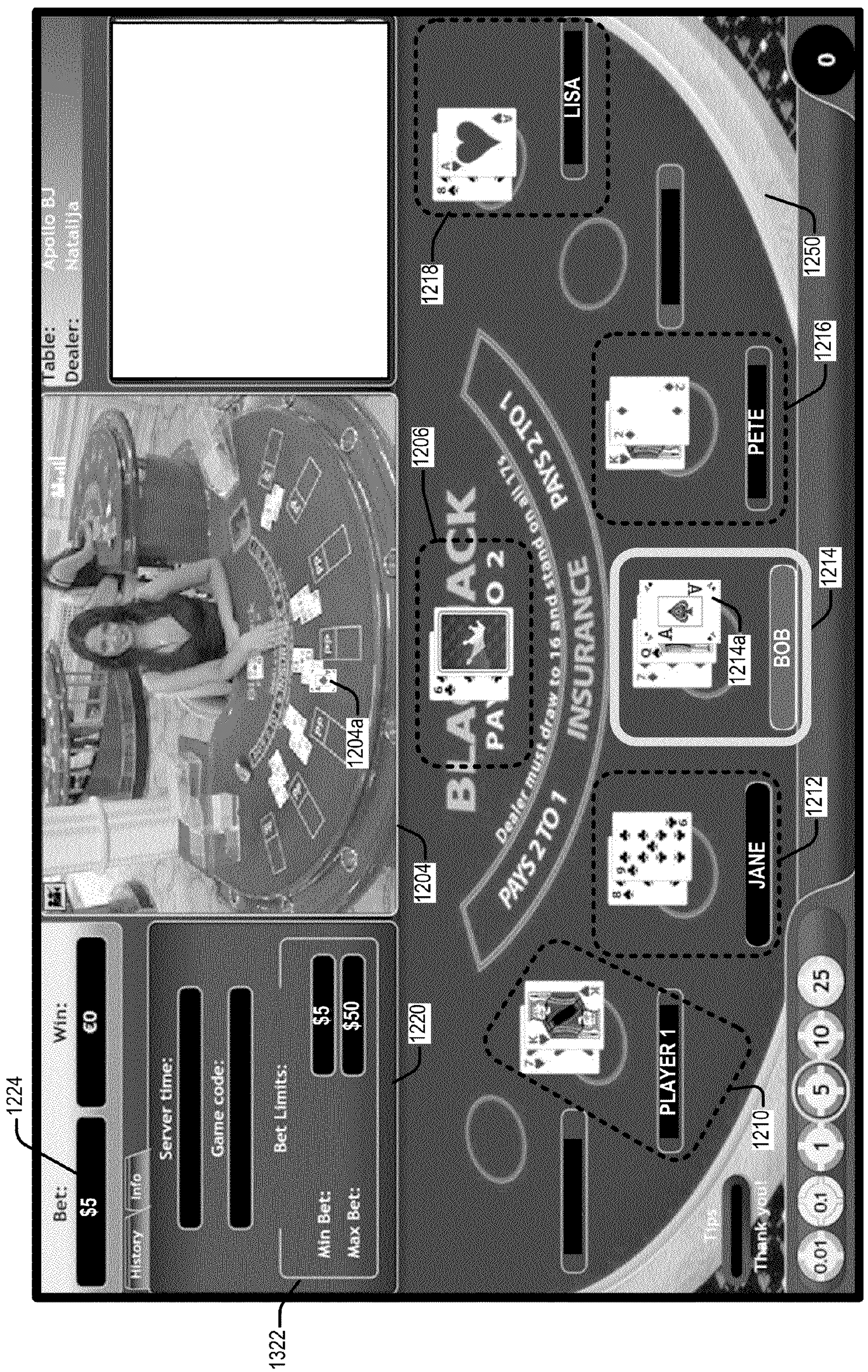
Figure 13B:
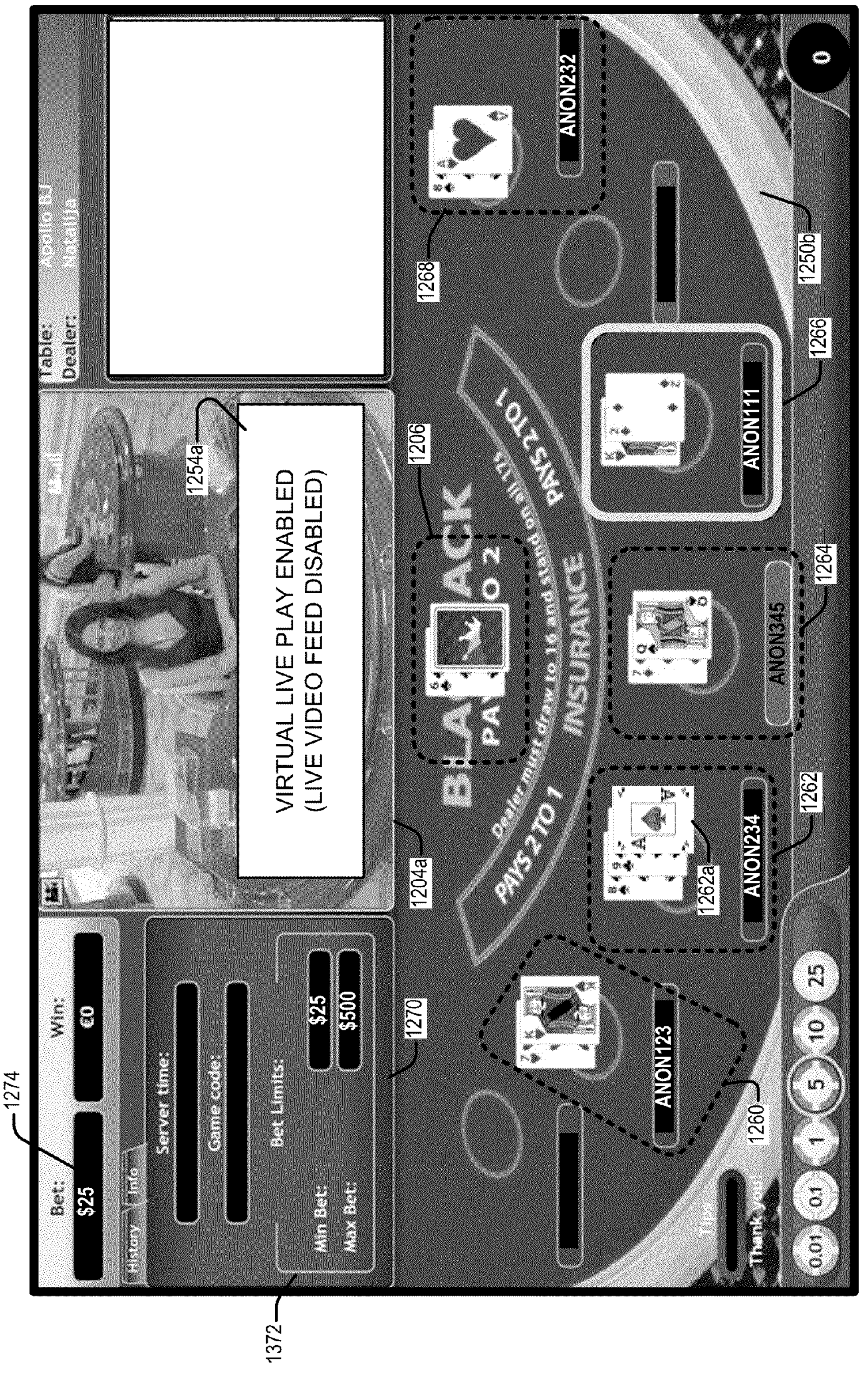

In the example embodiments illustrated in FIGS. 13A and 13B, it is assumed that a live blackjack game table (e.g., as shown at 1204 of FIGS. 13A and 13B) is being utilized to host at least two different live virtual blackjack table games, including a first live virtual blackjack table game 1300 of FIG. 13A, and a second live virtual blackjack table game 1390 of FIG. 13B. Initially, at the start of each gaming session, both the first and second live virtual blackjack table games are conducted concurrently using the same live blackjack game table and live dealer, which is visually presented to the players at each of the live virtual blackjack table games via live game table video feed 1204. The initial set of cards are dealt out to all players (and dealer) in each of the live virtual blackjack table games, and this activity is displayed via the live blackjack table video feed 1204. Thereafter, the first two players in the first and second live virtual blackjack table games provide substantially identical game play instructions (e.g., each player chooses to "stand"), and the card distributions in each of the gaming sessions remain synchronized.

However, in the first live virtual blackjack table game, as illustrated in FIG. 13A, it is assumed that the player at player station 1214 ("BOB") inputs the game play instruction "hit me". In contrast, in the second live virtual blackjack table game, as illustrated in FIG. 13B, it is assumed that the player at player station 1264 ("ANON345") inputs the game play instruction "stand". When these events are detected, the gaming system (which manages both the first and second live virtual blackjack table games) determines that a divergent event has been detected which will cause the subsequent card distributions in the first and second live virtual blackjack table games to diverge from one another. Accordingly, in at least one embodiment, the gaming system may respond by performing one or more of the following actions (or combinations thereof):

- Determine which of the live virtual blackjack table games should be selected for disabling the live blackjack game table video feed.
- Disable the live blackjack game table video feed at the live virtual blackjack table game which has been identified for disabling of the live blackjack game table video feed.
- Determine which of the live virtual blackjack table games should be selected for continuing the live blackjack game table video feed.
- Continue the live blackjack game table video feed at the live virtual blackjack table game which has been identified for continuing of the live blackjack game table video feed.
- Provide instructions to the live dealer for enabling the dealer to continue game play activities associated with the live virtual blackjack table game which has been identified for continuing of the live blackjack game table video feed.
- Disable live dealing at the live virtual blackjack table game which has been identified for disabling of the live blackjack game table video feed.
- Enable Virtual Live Play (VLP) functionality at the live virtual blackjack table game which has been identified for disabling of the live blackjack game table video feed. In at least one embodiment, the implementation of Virtual Live Play (VLP) functionality enables game play to continue at the identified live virtual blackjack table game by automating the subsequent game play activities using computer-based processes. For example, in one embodiment, the Virtual Live Play (VLP) functionality may utilize a computer-based process to virtually distribute (or virtually deal) remaining cards in the live gaming table's card shoe based on the known order of the cards in the shoe (which, for example, was previously determined by the live gaming tables electronic shuffler).

In at least one embodiment, the Virtual Live Play (VLP) functionality may be operable to enable divergent playing card distributions in multiple different live virtual table game sessions which were originally initiated using a common live game table dealer/attendant.

In the specific example embodiment of FIGS. 13A and 13B, it is assumed that the gaming system has determined to continue the live blackjack game table video feed for the first live virtual blackjack table game (FIG. 13A), and to disable the live blackjack game table video feed for the second live blackjack table game (FIG. 13B). Accordingly, the gaming system may provide instructions to the live dealer to deal one additional card to the player at player station 1214 ("BOB") in response to that player's "hit me" game play instruction. In response, as illustrated in the example embodiment of FIG. 13A (as shown, for example, at 1214*a* and 1204*a*), the dealer deals and ace of spades to the player at player station 1214. However, as illustrated in the example embodiment of FIG. 13B, the live blackjack game table video feed has been disabled (e.g., as indicated at 1254*a*), and virtual live play functionality has been enabled in the live blackjack table game of FIG. 13B. Accordingly, in at least one embodiment, subsequent game play activities in the live blackjack table game of FIG. 13B may be automatically performed using a computer-based process. For example, in the example embodiment of FIG. 13B, it is assumed that the virtual live play functionality processes the "stand" instruction provided by the player at player station 1264 ("ANON345"), and subsequently deals the next card (which the gaming system has determined to be the ace of spades 1262*a* based on the known order of cards in the shoe) to the player at player station 1262 in response to a "hit me" instruction from that player.

Figure 14:
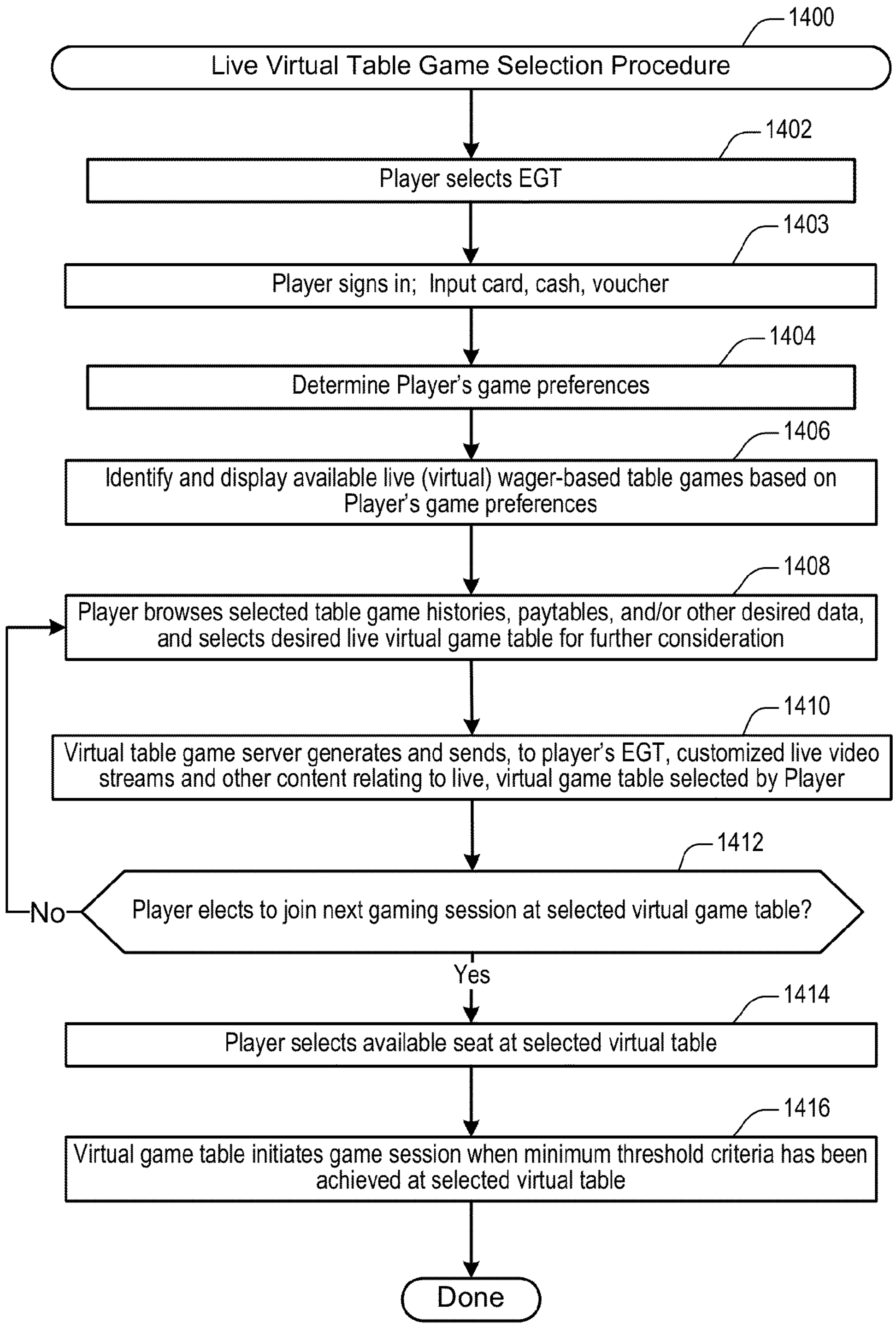
FIGS. 14-16 illustrate example embodiments of various flow diagrams which may be used for facilitating activities relating to one or more of the live virtual table game techniques disclosed herein.
Figure 15:
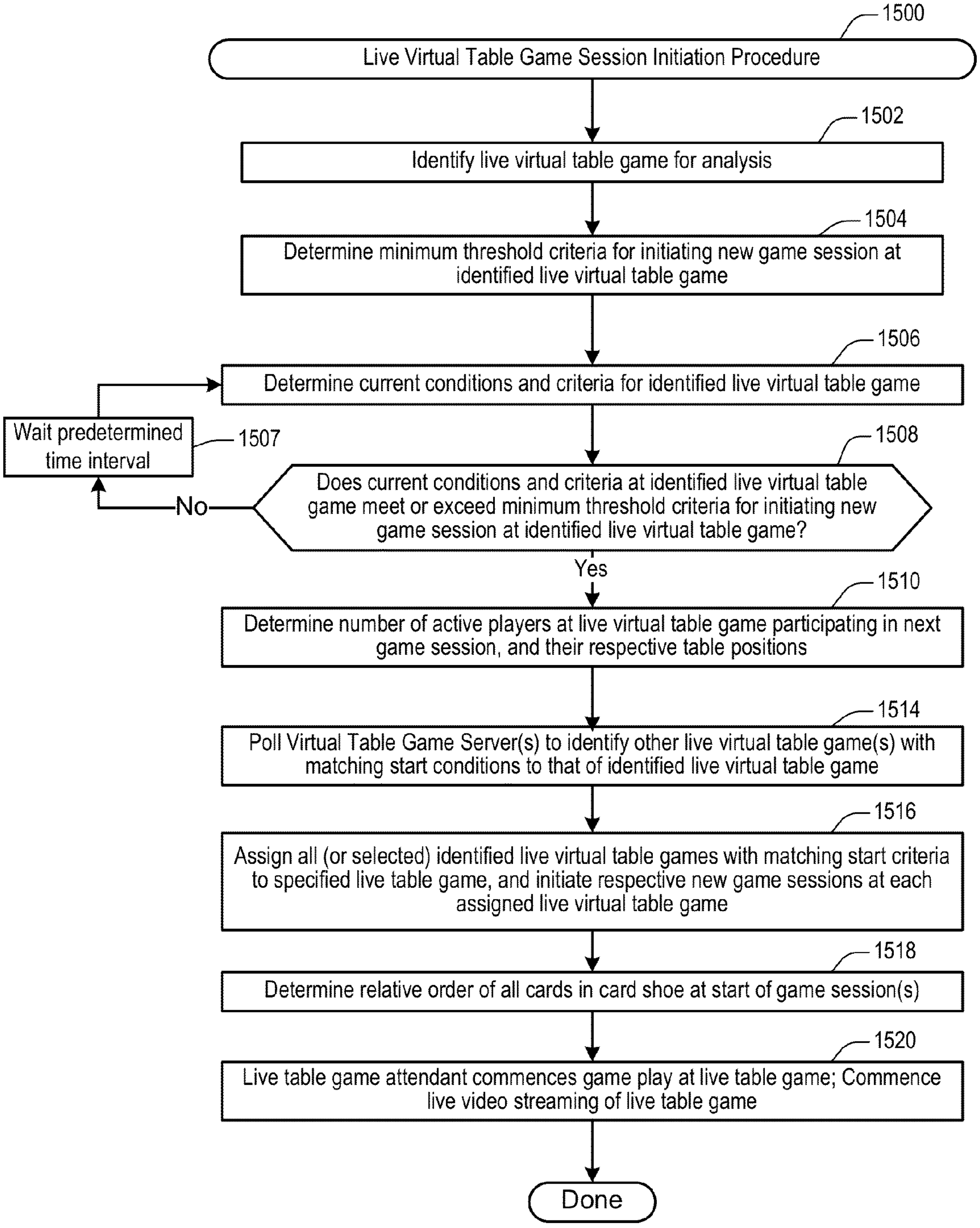
Figure 16:
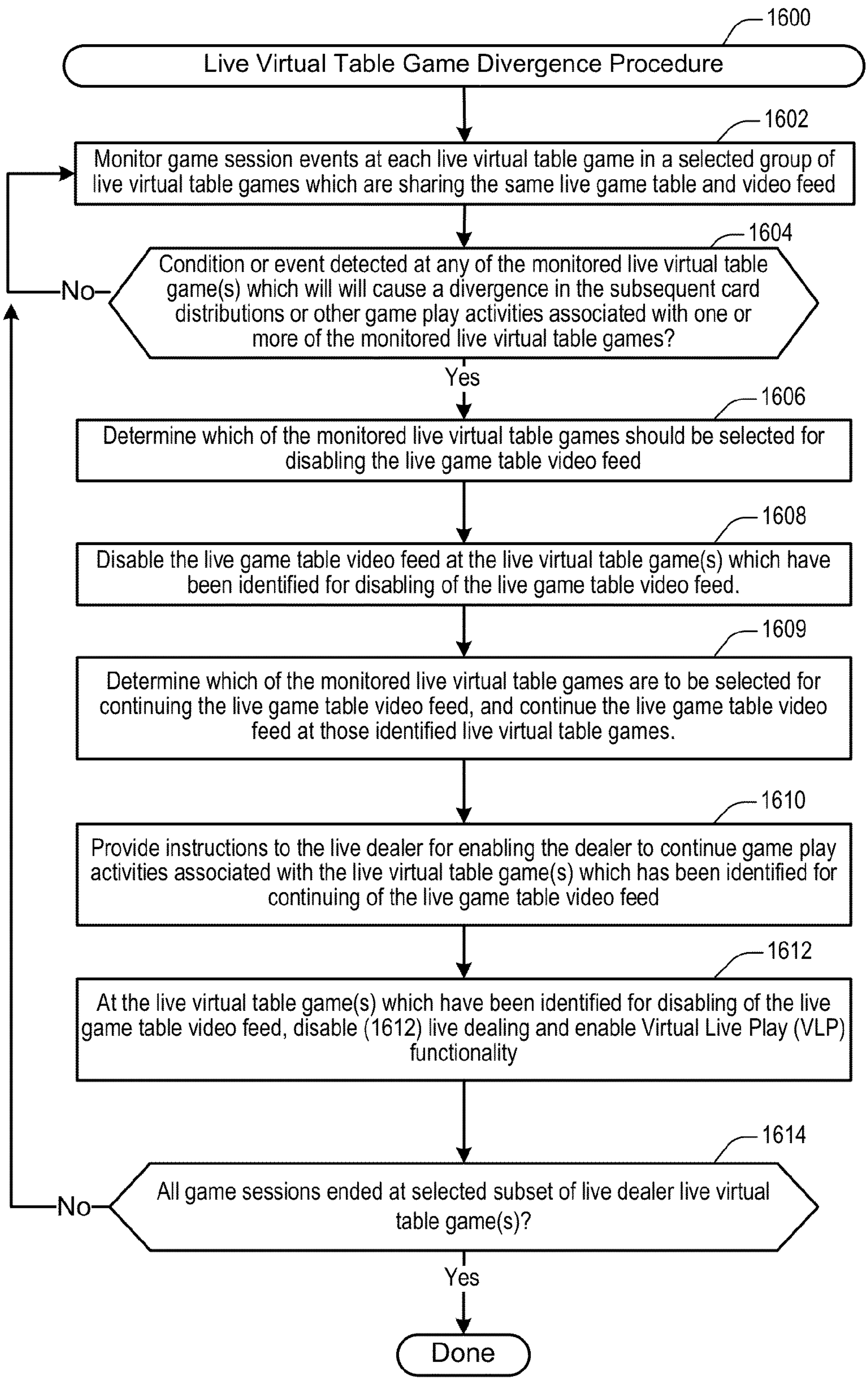

FIGS. 14-16 illustrate example embodiments of various flow diagrams which may be used for facilitating activities relating to one or more of the live virtual table game techniques disclosed herein.

According to different embodiments, at least a portion of the various types of functions, operations, actions, and/or other features provided by the Live Virtual Table Game Procedures described herein may be implemented at one or more gaming device(s), at one or more server systems(s), and/or combinations thereof. In at least one embodiment, the Live Virtual Table Game Procedures described herein may be operable to perform and/or implement various types of functions, operations, actions, and/or other features such as one or more of those described and/or referenced herein. In at least one embodiment, the Live Virtual Table Game Procedures described herein may be operable to utilize and/or generate various different types of data and/or other types of information when performing specific tasks and/or operations. This may include, for example, input data/information and/or output data/information. For example, in at least one embodiment, the Live Virtual Table Game Procedures described herein may be operable to access, process, and/or otherwise utilize information from one or more different types of sources, such as, for example, one or more local and/or remote memories, devices and/or systems. Additionally, in at least one embodiment, the Live Virtual Table Game Procedures described herein may be operable to generate one or more different types of output data/information, which, for example, may be stored in memory of one or more local and/or remote devices and/or systems. In at least one embodiment, a given instance of one or more of the Live Virtual Table Game Procedures described herein may access and/or utilize information from one or more associated databases. In at least one embodiment, at least a portion of the database information may be accessed via communication with one or more local and/or remote memory devices.

According to specific embodiments, multiple instances or threads of one or more of the Live Virtual Table Game Procedures described herein may be concurrently implemented and/or initiated via the use of one or more processors and/or other combinations of hardware and/or hardware and software. For example, in at least some embodiments, various aspects, features, and/or functionalities of the Live Virtual Table Game Procedures described herein may be performed, implemented and/or initiated by one or more of the various systems, components, systems, devices, procedures, processes, etc., described and/or referenced herein. According to different embodiments, one or more different threads or instances of the Live Virtual Table Game Procedures described herein may be initiated in response to detection of one or more conditions or events satisfying one or more different types of minimum threshold criteria for triggering initiation of at least one instance of the Live Virtual Table Game Procedures described herein. According to different embodiments, one or more different threads or instances of the Live Virtual Table Game Procedures described herein may be initiated and/or implemented manually, automatically, statically, dynamically, concurrently, and/or combinations thereof. Additionally, different instances and/or embodiments of the Live Virtual Table Game Procedures described herein may be initiated at one or more different time intervals (e.g., during a specific time interval, at regular periodic intervals, at irregular periodic intervals, upon demand, etc.).

In at least one embodiment, initial configuration of a given instance of the Live Virtual Table Game Procedures described herein may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Live Virtual Table Game Procedures described herein may correspond to and/or may be derived from the input data/information.

FIG. 14 shows a flow diagram of a Live Virtual Table Game Selection Procedure in accordance with a specific embodiment. In the specific example embodiment of FIG. 14 it is assumed that the Live Virtual Table Game Selection Procedure 1400 has been initiated by a gaming system to facilitate a player at a casino-based EGT in selecting and remotely participating in a live, multiplayer, wager-based, virtual table via use of the EGT. Accordingly, as illustrated in the example embodiment of FIG. 14, at 1402 it is assumed that the player selects and interacts with a desired casino-based EGT.

As shown at 1403, the player may sign in to the gaming system via the EGT. Additionally, in at least one embodiment, the player may input or provide to the EGT indicia of credit such as, for example, cash, credit card, voucher, gaming credit ticket, etc.

As shown at 1404, the player's game preferences may be determined. In at least one embodiment, the EGT may include functionality for automatically identifying or determining the identity of the player, and for automatically determining the identified player's game preferences using information from the player's profile (such as, for example, the player's player tracking profile). In one embodiment, the EGT may be configured or designed to automatically determine the player's game preferences, for example, by automatically scanning the player's player tracking card. In some embodiments, the player may manually enter or input his or her desired game preferences.

As shown at 1406, the gaming system may identify and display information relating to available live, virtual wager-based table games which may be played at the EGT. In at least one embodiment, at least a portion of the information displayed to the player may be filtered based on the player's identified game preferences.

As shown at 1408, the player may browse through various types of information relating to the available live, virtual wager-based table games. Such information may include, for example, one or more of the following (or combinations thereof): table game histories, table game payouts, paytables, dealer history, and/or other types of data which the player deems to be relevant. In the present example, it is assumed that the player identifies and selects the desired live virtual table game for further consideration.

As shown at 1410, the gaming system generates and sends, to the player's EGT, customized live video streams and/or other content relating to the live virtual table game selected by the player. In at least one embodiment, at least a portion of these activities may be implemented by a virtual table game server. In at least one embodiment, the player may be given an opportunity to view, via the EGT display, a live video feed of the live game table and live attendant (e.g., dealer) where the live, multiplayer, wager-based, virtual table game will be conducted, and/or may be given an opportunity to inspect the live virtual game session display GUI which will be used during active game play of the live, multiplayer, wager-based, virtual table game.

As shown at 1412, if the player elects not to join the next gaming session at the selected live virtual table game, he or she may elect to browse through other available live virtual table games. Alternatively, should the user elect to join the next gaming session at the selected live virtual table game, the player may select (1414) an available seat at the selected live virtual table game.

As shown at 1416, initiation of the next gaming session at the selected live virtual table game may automatically commence once the gaming system has determined that specific minimum threshold criteria has been met or exceeded. This aspect is described in greater detail with respect to FIG. 15.

FIG. 15 shows a flow diagram of a Live Virtual Table Game Session Initiation Procedure in accordance with a specific embodiment. In at least one embodiment, the Live Virtual Table Game Session Initiation Procedure 1500 may be configured or designed to facilitate the initiation of a live virtual table game session involving multiple different players at multiple different EGTs.

As shown at 1502, a specific live virtual table game may be identified and selected for analysis.

As shown at 1504, the gaming system may determine the minimum threshold criteria which is required (or preferred) for initiating a new gaming session at the identified live virtual table game. According to different embodiments, different types of live virtual table games may have associated therewith different types of minimum threshold criteria which may need to be satisfied (or exceeded) in order to initiate a new gaming session. Examples of such minimum threshold criteria may include, but are not limited to, one or more of the following (or combinations thereof):

- Minimum number of players needed to initiate gaming session.
- Maximum number of players allowed.
- Next gaming session to be initiated at specified time (e.g., Next gaming session to commence at 12:35 PM).
- Next gaming session to be initiated upon expiration of predetermined time interval (e.g., next gaming session to commence and 60 seconds).
- Seats at virtual game table may have no more than n vacancies.
- Other criteria and/or conditions which may be specified by casino operators and/or which may be required by jurisdictional regulations.

As shown at 1506, the gaming system may determine or ascertain the current conditions and/or current criteria for the identified live virtual table game.

As shown at 1508 a determination may be made as to whether or not current conditions and criteria at the identified live virtual table game meet or exceed the minimum specified threshold criteria for initiating new game session at the identified live virtual table game. In one embodiment, if it is determined that current conditions and criteria at the identified live virtual table game do not meet or exceed the minimum specified threshold criteria for initiating new game session at the identified live virtual table game, the gaming system may wait (1507) a predetermined time interval and then re-check the then current conditions and/or criteria for the identified live virtual table game.

In at least one embodiment, when is determined that the current conditions and criteria at the identified live virtual table game does meet or exceed the minimum specified threshold criteria for initiating new game session at the identified live virtual table game, the gaming system may determine (1510) the number of players who will be participating in the next game session at the identified live virtual table game, and may further identify the relative positions of each player at the identified live virtual table game.

In some embodiments, the gaming system may attempt to identify and group together multiple different live virtual table game sessions which have substantially similar starting conditions/criteria in order to enable multiple different live virtual table game sessions (e.g., involving different groups of players in each of the different live virtual table game sessions) to be conducted using a common live game table and live dealer/attendant. Accordingly, as shown at 1514, the gaming system may poll one or more virtual table game servers to identify other live virtual table game(s) which may have starting conditions/criteria that are substantially similar to that of the identified live virtual table game. Examples of different types of starting conditions/criteria which may be considered may include, but are not limited to, one or more of the following (or combinations thereof):

- Same table game type (e.g., Texas Hold'em, blackjack, Baccarat, etc.).
- Same number of players.
- Same player stations (e.g., seats at live virtual table game) occupied
- Minimum threshold criteria for initiating new gaming session satisfied
- etc.

Assuming that one or more additional live virtual table game(s) have been identified which have starting conditions/criteria that are substantially similar to that of the identified live virtual table game, all (or selected ones of) the identified live virtual table games with matching start criteria may be assigned (1516) to a specified live game table (and accompanying live dealer/attendant), and a respective, new game session may be initiated at each of the assigned live virtual table games.

In at least one embodiment where the specified live game table corresponds to a live card game table, the gaming system may determine (1518) the relative order of all cards in the game table card shoe at start of game play. As described previously, this may be accomplished via use of a suitable electronic card shuffler.

As shown at 1520, the live table game attendant may be instructed by the gaming system to commence game play activities at the live table game. Additionally, the live game table video feed may be streamed to all remote players who are participating in game play activities at the live game table.

It will be appreciated that different embodiments of the Live Virtual Table Game Session Initiation Procedure (not shown) may include additional features and/or operations than those illustrated in the specific embodiment of FIG. 15, and/or may omit at least a portion of the features and/or operations of Live Virtual Table Game Session Initiation Procedure illustrated in the specific embodiment of FIG. 15.

FIG. 16 shows a flow diagram of a Live Virtual Table Game Divergence Procedure in accordance with a specific embodiment. In at least one embodiment, the Live Virtual Table Game Session Initiation Procedure 1600 may be configured or designed to handle situations in which a divergent condition or event has been detected which will cause a divergence in the subsequent card distributions or other game play activities associated with one or more live virtual table games which are sharing the same live game table and video feed.

As shown at 1602, the gaming system may Monitor game session events at each live virtual table game in a selected group of live virtual table games which are sharing the same live game table and video feed.

As shown at 1604, a determination may be made as to whether or not any condition or event has been detected at any of the monitored live virtual table game(s) which will cause a divergence in the subsequent card distributions or other game play activities associated with one or more of the monitored live virtual table game.

In at least one embodiment, if such a condition or event is detected at one or more of the monitored live virtual table game(s), the gaming system may respond by facilitating, enabling, initiating, and/or performing one or more of the following operation(s), action(s), and/or feature(s) (or combinations thereof):

- Determine (1606) which of the monitored live virtual table games should be selected for disabling the live game table video feed. According to different embodiments, such a determination may be based on various different types of criteria such as, for example: the minority group of diverging live virtual table game(s), status or ratings of participating players, estimated likelihood of the occurrence of future divergent events, random selection, etc.
- Disable (1608) the live game table video feed at the live virtual table game(s) which have been identified for disabling of the live game table video feed.
- Determine (1609) which of the monitored live virtual table games are to be selected for continuing the live game table video feed, and continue the live game table video feed at those identified live virtual table games. In at least one embodiment, this may involve identifying one or more subsets of the monitored live virtual table game(s) which currently maintain the synchronized card distributions to their respective players (and dealer).
- Provide (1610) instructions to the live dealer for enabling the dealer to continue game play activities associated with the live virtual table game(s) which has been identified for continuing of the live game table video feed.
- At the live virtual table game(s) which have been identified for disabling of the live game table video feed, disable (1612) live dealing and enable Virtual Live Play (VLP) functionality.
- Continue to monitor game session events at each live virtual table game in a selected group of live virtual table games which are sharing the same live game table and video feed until all gaming sessions associated with that group of live virtual table game have ended (1614).

In at least one embodiment, the implementation of Virtual Live Play (VLP) functionality enables game play to continue at the identified live virtual table game by automating the subsequent game play activities using computer-based processes. For example, in one embodiment, the Virtual Live Play (VLP) functionality may utilize a computer-based process to virtually distribute (or virtually deal) remaining cards in the live gaming table's card shoe based on the known order of the cards in the shoe (which, for example, was previously determined by the live gaming tables electronic shuffler).

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

The invention claimed is:

1. A gaming system in a casino gaming network, comprising:

a first electronic game terminal ("EGT") located in a first physical casino venue, the first EGT being remotely located from the live casino game table;

a second electronic game terminal ("EGT") located in a second physical casino venue, the second EGT being remotely located from the live casino game table;

at least one interface for communicating with at least one other device in the gaming network;

a gaming controller;

a memory storing a plurality of instructions;

wherein when the gaming controller executes the plurality of instructions stored in the memory, the gaming controller operates with the at least one interface to:

control a first multi-site, multi-player, wager-based game session ("first game session") conducted via a live casino game table at a first physical location, the first game session having associated therewith a first set of game/wager-related criteria, the live casino game table being located at a third physical casino venue;

receive a first request for a first remote player to participate in the first game session via the first EGT;

dynamically determine whether participation by the first remote player in the first game session via the first EGT is compliant with jurisdictional rules and regulations governing play at the live casino game table location;

prevent the first remote player from participating in the first game session via the first EGT if it is determined that participation by the first remote player in the first game session via the first EGT is not compliant with the jurisdictional rules and regulations governing play at the live casino game table location;

receive a second request for a second remote player to participate in the first game session via the second EGT;

dynamically determine whether participation by the second remote player in the first game session via the second EGT is compliant with the jurisdictional rules and regulations governing play at the live casino game table location;

prevent the second remote player from participating in the first game session via the second EGT if it is determined that participation by the second remote player in the first game session via the second EGT is not compliant with the jurisdictional rules and regulations governing play at the live casino game table location;

identify a first set of game/wager-related criteria associated with the first game session, wherein the first set of criteria includes at least one criteria selected from a group consisting of: time limit per play, amount per wager, max wager, maximum wager, rules to facilitate speed of game play, payout criteria, paytable criteria, game play rules, and wagering rules;

dynamically determine if the first set of game/wager-related criteria is compliant with the third physical casino's rules governing play of the multi-player, wager-based game at the live casino game table;

prevent the first remote player from participating in the first game session via the first EGT if it is determined that the first set of game/wager-related criteria is not compliant with the third physical casino's rules governing play of the multi-player, wager-based game at the live casino game table;

prevent the second remote player from participating in the first game session via the second EGT if it is determined that the first set of game/wager-related criteria is not compliant with the second physical casino's rules governing play of the multi-player, wager-based game at the live casino game table;

generate a virtual game table graphical user interface ("virtual game table GUI") which represents the live casino game table;

cause a first instance of the virtual game table GUI to be displayed at the first EGT;

if the first remote player is not prevented from participating in the first game session via the first EGT, enable the first remote player to participate in the first game session via interaction with the first instance of the virtual game table GUI;

cause a second instance of the virtual game table GUI to be displayed at the second EGT;

if the second remote player is not prevented from participating in the first game session via the second EGT, enable the second remote player to participate in the first game session via interaction with the second instance of the virtual game table GUI; and advance a game state of the first game session via a first set of activities performed at the live casino game table.

2. The system of claim 1 being further operable to:

dynamically determine, using the first set of game/wager-related criteria, whether participation by the first remote player in the first game session via the first EGT is compliant with a first set of jurisdictional rules and regulations governing play of wager-based games at the first EGT;

prevent the first remote player from participating in the first game session via the first EGT if it is determined that participation by the first remote player in the first game session via the first EGT is not compliant with a first set of jurisdictional rules and regulations governing play of wager-based games at the first EGT;

dynamically determine, using the first set of game/wager-related criteria whether participation by the second remote player in the first game session via the second EGT is compliant with a second set of jurisdictional rules and regulations governing play of wager-based games at the second EGT;

prevent the second remote player from participating in the first game session via the second EGT if it is determined that participation by the second remote player in the first game session via the second EGT is not compliant with a second set of jurisdictional rules and regulations governing play of wager-based games at the first EGT.

3. The system of claim 1 being further operable to:

prevent the first remote player from participating in the first game session via the first EGT if it is determined that participation by the first remote player in the first game session via the first EGT is not compliant with the first set of jurisdictional rules and regulations governing play of wager-based games at the first EGT; and prevent the second remote player from participating in the first game session via the second EGT if it is determined that participation by the second remote player in the first game session via the second EGT is not compliant with the second set of jurisdictional rules and regulations governing play of wager-based games at the second EGT.

4. The system of claim 1 being further operable to:

prevent the first remote player from participating in the first game session via the first EGT if it is determined that participation by the first remote player in the first game session via the first EGT is not compliant with the first physical casino's rules governing play of the multi-player, wager-based game via the first EGT; and prevent the second remote player from participating in the first game session via the second EGT if it is determined that participation by the second remote player in the first game session via the second EGT is not compliant with the second physical casino's rules governing play of the multi-player, wager-based game via the second EGT.

5. The system of claim 1 being further operable to:

prevent the first remote player from participating in the first game session via the first EGT if it is determined that participation by the first remote player in the first game session via the first EGT is not compliant with local rules and regulations governing play of the multi-player, wager-based game at the live casino game table; and prevent the second remote player from participating in the first game session via the second EGT if it is determined that participation by the second remote player in the first game session via the second EGT is not compliant with local rules and regulations governing play of the multi-player, wager-based game at the live casino game table.

6. The system of claim 1 being further operable to:

prevent the first remote player from participating in the first game session via the first EGT if it is determined that participation by the first remote player in the first game session via the first EGT is not compliant with the first set of jurisdictional rules and regulations governing play of wager-based games at the first EGT;

prevent the second remote player from participating in the first game session via the second EGT if it is determined that participation by the second remote player in the first game session via the second EGT is not compliant with the second set of jurisdictional rules and regulations governing play of wager-based games at the second EGT;

prevent the first remote player from participating in the first game session via the first EGT if it is determined that participation by the first remote player in the first game session via the first EGT is not compliant with the first physical casino's rules governing play of the multi-player, wager-based game via the first EGT;

prevent the second remote player from participating in the first game session via the second EGT if it is determined that participation by the second remote player in the first game session via the second EGT is not compliant with the second physical casino's rules governing play of the multi-player, wager-based game via the second EGT;

prevent the first remote player from participating in the first game session via the first EGT if it is determined that participation by the first remote player in the first game session via the first EGT is not compliant with local rules and regulations governing play of the multi-player, wager-based game at the live casino game table; and prevent the second remote player from participating in the first game session via the second EGT if it is determined that participation by the second remote player in the first game session via the second EGT is not compliant with local rules and regulations governing play of the multi-player, wager-based game at the live casino game table.

7. The system of claim 1:

wherein the virtual game table GUI includes a representation of the first remote player located at a first player station of the first virtual game table;

wherein the representation of the first virtual game table includes a representation of the second remote player located at a second player station of the first virtual game table;

the system being further operable to:

dynamically determine a current game state of the first game session based upon gaming activities conducted at the first live game table; and update content presented in the first and second instances of the virtual game table GUI to reflect a current game state at the first virtual game table which is substantially identical to the current game state of the first game session.

8. The system of claim 1 being further operable to:

receive a first set of game play instructions from the first remote player;

cause the game state of the first game session to advance via execution of the first set of game play instructions at the live casino game table; and cause an outcome of at least one future event relating to the second remote player's participation in the first game session to be affected by the execution of the first set of game play instructions at the live casino game table.

9. The system of claim 1 being further operable to:

dynamically determine if the first set of game/wager-related criteria is compliant with a first set of jurisdictional rules and regulations governing play of wager-based games at the first EGT;

dynamically determine if the first set of game/wager-related criteria is compliant with a second set of jurisdictional rules and regulations governing play of wager-based games at the second EGT;

prevent the first remote player from participating in the first game session via the first EGT if it is determined that the first set of game/wager-related criteria is not compliant with the first set of jurisdictional rules and regulations governing play of wager-based games at the first EGT; and prevent the second remote player from participating in the first game session via the second EGT if it is determined that the first set of game/wager-related criteria is not compliant with the second set of jurisdictional rules and regulations governing play of wager-based games at the second EGT.

10. The system of claim 1 being further operable to:

dynamically determine if the first set of game/wager-related criteria is compliant with the first physical casino's rules governing play of the multi-player, wager-based game via the first EGT;

dynamically determine if the first set of game/wager-related criteria is compliant with the second physical casino's rules governing play of the multi-player, wager-based game via the second EGT;

prevent the first remote player from participating in the first game session via the first EGT if it is determined that the first set of game/wager-related criteria is not compliant with the first physical casino's rules governing play of the multi-player, wager-based game via the first EGT; and prevent the second remote player from participating in the first game session via the second EGT if it is determined that first set of game/wager-related criteria is not compliant with the second physical casino's rules governing play of the multi-player, wager-based game via the second EGT.

11. The system of claim 1:

wherein the first physical casino venue is different from the third physical casino venue; and wherein the second physical casino venue is different from the third physical casino venue.

12. The system of claim 1 being further operable to:

dynamically determine if the first set of game/wager-related criteria is compliant with a third set of jurisdictional rules and regulations governing play of wager-based games at the live casino game table;

prevent the first remote player from participating in the first game session via the first EGT if it is determined that the first set of game/wager-related criteria is not compliant with the third set of jurisdictional rules and regulations governing play of wager-based games at the first physical location; and prevent the second remote player from participating in the first game session via the second EGT if it is determined that the first set of game/wager-related criteria is not compliant with the third set of jurisdictional rules and regulations governing play of wager-based games at the first physical location.

13. The system of claim 1 being further operable to:

dynamically determine if the first set of game/wager-related criteria is compliant with a first set of jurisdictional rules and regulations governing play of wager-based games at the first EGT;

prevent the first remote player from participating in the first game session via the first EGT if it is determined that the first set of game/wager-related criteria is not compliant with the first set of jurisdictional rules and regulations governing play of wager-based games at the first EGT;

dynamically determine if the first set of game/wager-related criteria is compliant with a second set of jurisdictional rules and regulations governing play of wager-based games at the second EGT;

prevent the second remote player from participating in the first game session via the second EGT if it is determined that the first set of game/wager-related criteria is not compliant with the second set of jurisdictional rules and regulations governing play of wager-based games at the second EGT;

dynamically determine if the first set of game/wager-related criteria is compliant with the first physical casino's rules governing play of the multi-player, wager-based game via the first EGT;

prevent the first remote player from participating in the first game session via the first EGT if it is determined that the first set of game/wager-related criteria is not compliant with the first physical casino's rules governing play of the multi-player, wager-based game via the first EGT;

dynamically determine if the first set of game/wager-related criteria is compliant with the second physical casino's rules governing play of the multi-player, wager-based game via the second EGT;

prevent the second remote player from participating in the first game session via the second EGT if it is determined that first set of game/wager-related criteria is not compliant with the second physical casino's rules governing play of the multi-player, wager-based game via the second EGT;

dynamically determine if the first set of game/wager-related criteria is compliant with a third set of jurisdictional rules and regulations governing play of wager-based games at the live casino game table;

prevent the first remote player from participating in the first game session via the first EGT if it is determined that the first set of game/wager-related criteria is not compliant with the third set of jurisdictional rules and regulations governing play of wager-based games at the first physical location; and prevent the second remote player from participating in the first game session via the second EGT if it is determined that the first set of game/wager-related criteria is not compliant with the third set of jurisdictional rules and regulations governing play of wager-based games at the first physical location.

14. A computer implemented method for operating a gaming device in a gaming network, the method comprising causing at least one processor to execute a plurality of instructions, including:

controlling a first multi-site, multi-player, wager-based game session ("first game session") conducted via a live casino game table at a first physical location, the first game session having associated therewith a first set of game/wager-related criteria, the live casino game table being located at a third physical casino venue;

receiving a first request for a first remote player to participate in the first game session via the first EGT;

dynamically determining whether participation by the first remote player in the first game session via the first EGT is compliant with jurisdictional rules and regulations governing play at the live casino game table location;

preventing the first remote player from participating in the first game session via the first EGT if it is determined that participation by the first remote player in the first game session via the first EGT is not compliant with the jurisdictional rules and regulations governing play at the live casino game table location;

receiving a second request for a second remote player to participate in the first game session via the second EGT;

dynamically determining whether participation by the second remote player in the first game session via the second EGT is compliant with the jurisdictional rules and regulations governing play at the live casino game table location;

preventing the second remote player from participating in the first game session via the second EGT if it is determined that participation by the second remote player in the first game session via the second EGT is not compliant with the jurisdictional rules and regulations governing play at the live casino game table location;

identifying a first set of game/wager-related criteria associated with the first game session, wherein the first set of criteria includes at least one criteria selected from a group consisting of: time limit per play, amount per wager, max wager, maximum wager, rules to facilitate speed of game play, payout criteria, paytable criteria, game play rules, and wagering rules;

dynamically determining if the first set of game/wager-related criteria is compliant with the third physical casino's rules governing play of the multi-player, wager-based game at the live casino game table;

preventing the first remote player from participating in the first game session via the first EGT if it is determined that the first set of game/wager-related criteria is not compliant with the third physical casino's rules governing play of the multi-player, wager-based game at the live casino game table;

preventing the second remote player from participating in the first game session via the second EGT if it is determined that the first set of game/wager-related criteria is not compliant with the second physical casino's rules governing play of the multi-player, wager-based game at the live casino game table;

generating a virtual game table graphical user interface ("virtual game table GUI") which represents the live casino game table;

causing a first instance of the virtual game table GUI to be displayed at the first EGT;

enabling the first remote player to participate in the first game session via interaction with the first instance of the virtual game table GUI if the first remote player is not prevented from participating in the first game session via the first EGT;

causing a second instance of the virtual game table GUI to be displayed at the second EGT;

enabling the second remote player to participate in the first game session via interaction with the second instance of the virtual game table GUI if the second remote player is not prevented from participating in the first game session via the second EGT; and advancing a game state of the first game session via a first set of activities performed at the live casino game table.

15. The method of claim 14 further comprising:

dynamically determining, using the first set of game/wager-related criteria, whether participation by the first remote player in the first game session via the first EGT is compliant with a first set of jurisdictional rules and regulations governing play of wager-based games at the first EGT;

preventing the first remote player from participating in the first game session via the first EGT if it is determined that participation by the first remote player in the first game session via the first EGT is not compliant with a first set of jurisdictional rules and regulations governing play of wager-based games at the first EGT;

dynamically determining, using the first set of game/wager-related criteria whether participation by the second remote player in the first game session via the second EGT is compliant with a second set of jurisdictional rules and regulations governing play of wager-based games at the second EGT;

preventing the second remote player from participating in the first game session via the second EGT if it is determined that participation by the second remote player in the first game session via the second EGT is not compliant with a second set of jurisdictional rules and regulations governing play of wager-based games at the first EGT.

16. The method of claim 14 further comprising:

preventing the first remote player from participating in the first game session via the first EGT if it is determined that participation by the first remote player in the first game session via the first EGT is not compliant with the first set of jurisdictional rules and regulations governing play of wager-based games at the first EGT; and preventing the second remote player from participating in the first game session via the second EGT if it is determined that participation by the second remote player in the first game session via the second EGT is not compliant with the second set of jurisdictional rules and regulations governing play of wager-based games at the second EGT.

17. The method of claim 14 further comprising:

preventing the first remote player from participating in the first game session via the first EGT if it is determined that participation by the first remote player in the first game session via the first EGT is not compliant with the first physical casino's rules governing play of the multi-player, wager-based game via the first EGT; and preventing the second remote player from participating in the first game session via the second EGT if it is determined that participation by the second remote player in the first game session via the second EGT is not compliant with the second physical casino's rules governing play of the multi-player, wager-based game via the second EGT.

18. The method of claim 14 further comprising:

preventing the first remote player from participating in the first game session via the first EGT if it is determined that participation by the first remote player in the first game session via the first EGT is not compliant with local rules and regulations governing play of the multi-player, wager-based game at the live casino game table; and preventing the second remote player from participating in the first game session via the second EGT if it is determined that participation by the second remote player in the first game session via the second EGT is not compliant with local rules and regulations governing play of the multi-player, wager-based game at the live casino game table.

19. The method of claim 14 further comprising:

preventing the first remote player from participating in the first game session via the first EGT if it is determined that participation by the first remote player in the first game session via the first EGT is not compliant with the first set of jurisdictional rules and regulations governing play of wager-based games at the first EGT;

preventing the second remote player from participating in the first game session via the second EGT if it is determined that participation by the second remote player in the first game session via the second EGT is not compliant with the second set of jurisdictional rules and regulations governing play of wager-based games at the second EGT;

preventing the first remote player from participating in the first game session via the first EGT if it is determined that participation by the first remote player in the first game session via the first EGT is not compliant with the first physical casino's rules governing play of the multi-player, wager-based game via the first EGT;

preventing the second remote player from participating in the first game session via the second EGT if it is determined that participation by the second remote player in the first game session via the second EGT is not compliant with the second physical casino's rules governing play of the multi-player, wager-based game via the second EGT;

preventing the first remote player from participating in the first game session via the first EGT if it is determined that participation by the first remote player in the first game session via the first EGT is not compliant with local rules and regulations governing play of the multi-player, wager-based game at the live casino game table; and preventing the second remote player from participating in the first game session via the second EGT if it is determined that participation by the second remote player in the first game session via the second EGT is not compliant with local rules and regulations governing play of the multi-player, wager-based game at the live casino game table.

20. The method of claim 14:

wherein the virtual game table GUI includes a representation of the first remote player located at a first player station of the first virtual game table;

wherein the representation of the first virtual game table includes a representation of the second remote player located at a second player station of the first virtual game table;

the method further comprising:

dynamically determining a current game state of the first game session based upon gaming activities conducted at the first live game table; and updating content presented in the first and second instances of the virtual game table GUI to reflect a current game state at the first virtual game table which is substantially identical to the current game state of the first game session.

21. The method of claim 14 further comprising:

receiving a first set of game play instructions from the first remote player;

causing the game state of the first game session to advancing via execution of the first set of game play instructions at the live casino game table; and causing an outcome of at least one future event relating to the second remote player's participation in the first game session to be affected by the execution of the first set of game play instructions at the live casino game table.

22. The method of claim 14 further comprising:

dynamically determining if the first set of game/wager-related criteria is compliant with a first set of jurisdictional rules and regulations governing play of wager-based games at the first EGT;

dynamically determining if the first set of game/wager-related criteria is compliant with a second set of jurisdictional rules and regulations governing play of wager-based games at the second EGT;

preventing the first remote player from participating in the first game session via the first EGT if it is determined that the first set of game/wager-related criteria is not compliant with the first set of jurisdictional rules and regulations governing play of wager-based games at the first EGT; and preventing the second remote player from participating in the first game session via the second EGT if it is determined that the first set of game/wager-related criteria is not compliant with the second set of jurisdictional rules and regulations governing play of wager-based games at the second EGT.

23. The method of claim 14 further comprising:

dynamically determining if the first set of game/wager-related criteria is compliant with the first physical casino's rules governing play of the multi-player, wager-based game via the first EGT;

dynamically determining if the first set of game/wager-related criteria is compliant with the second physical casino's rules governing play of the multi-player, wager-based game via the second EGT;

preventing the first remote player from participating in the first game session via the first EGT if it is determined that the first set of game/wager-related criteria is not compliant with the first physical casino's rules governing play of the multi-player, wager-based game via the first EGT; and preventing the second remote player from participating in the first game session via the second EGT if it is determined that first set of game/wager-related criteria is not compliant with the second physical casino's rules governing play of the multi-player, wager-based game via the second EGT.

24. The method of claim 14:

wherein the first physical casino venue is different from the third physical casino venue; and wherein the second physical casino venue is different from the third physical casino venue.

25. The method of claim 14 further comprising:

dynamically determining if the first set of game/wager-related criteria is compliant with a third set of jurisdictional rules and regulations governing play of wager-based games at the live casino game table;

preventing the first remote player from participating in the first game session via the first EGT if it is determined that the first set of game/wager-related criteria is not compliant with the third set of jurisdictional rules and regulations governing play of wager-based games at the first physical location; and preventing the second remote player from participating in the first game session via the second EGT if it is determined that the first set of game/wager-related criteria is not compliant with the third set of jurisdictional rules and regulations governing play of wager-based games at the first physical location.

26. The method of claim 14 further comprising:

dynamically determining if the first set of game/wager-related criteria is compliant with a first set of jurisdictional rules and regulations governing play of wager-based games at the first EGT;

preventing the first remote player from participating in the first game session via the first EGT if it is determined that the first set of game/wager-related criteria is not compliant with the first set of jurisdictional rules and regulations governing play of wager-based games at the first EGT;

dynamically determining if the first set of game/wager-related criteria is compliant with a second set of jurisdictional rules and regulations governing play of wager-based games at the second EGT;

preventing the second remote player from participating in the first game session via the second EGT if it is determined that the first set of game/wager-related criteria is not compliant with the second set of jurisdictional rules and regulations governing play of wager-based games at the second EGT;

dynamically determining if the first set of game/wager-related criteria is compliant with the first physical casino's rules governing play of the multi-player, wager-based game via the first EGT;

preventing the first remote player from participating in the first game session via the first EGT if it is determined that the first set of game/wager-related criteria is not compliant with the first physical casino's rules governing play of the multi-player, wager-based game via the first EGT;

dynamically determining if the first set of game/wager-related criteria is compliant with the second physical casino's rules governing play of the multi-player, wager-based game via the second EGT;

preventing the second remote player from participating in the first game session via the second EGT if it is determined that first set of game/wager-related criteria is not compliant with the second physical casino's rules governing play of the multi-player, wager-based game via the second EGT;

dynamically determining if the first set of game/wager-related criteria is compliant with a third set of jurisdictional rules and regulations governing play of wager-based games at the live casino game table;

preventing the first remote player from participating in the first game session via the first EGT if it is determined that the first set of game/wager-related criteria is not compliant with the third set of jurisdictional rules and regulations governing play of wager-based games at the first physical location; and preventing the second remote player from participating in the first game session via the second EGT if it is determined that the first set of game/wager-related criteria is not compliant with the third set of jurisdictional rules and regulations governing play of wager-based games at the first physical location.

27. A gaming system in a casino gaming network, comprising:

a first electronic game terminal ("EGT") located in a first physical casino venue, the first EGT being remotely located from the live casino game table;

a second electronic game terminal ("EGT") located in a second physical casino venue, the second EGT being remotely located from the live casino game table;

means for controlling a first multi-site, multi-player, wager-based game session ("first game session") conducted via a live casino game table at a first physical location, the first game session having associated therewith a first set of game/wager-related criteria;

means for receiving a first request for a first remote player to participate in the first game session via the first EGT;

means for receiving a second request for a second remote player to participate in the first game session via the second EGT;

means for identifying a first set of game/wager-related criteria associated with the first game session, wherein the first set of criteria includes at least one criteria selected from a group consisting of: time limit per play, amount per wager, max wager, maximum wager, rules to facilitate speed of game play, payout criteria, paytable criteria, game play rules, and wagering rules;

means for dynamically determining if the first set of game/wager-related criteria is compliant with a first set of jurisdictional rules and regulations governing play of wager-based games at the first EGT;

means for preventing the first remote player from participating in the first game session via the first EGT if it is determined that the first set of game/wager-related criteria is not compliant with the first set of jurisdictional rules and regulations governing play of wager-based games at the first EGT;

means for dynamically determining if the first set of game/wager-related criteria is compliant with a second set of jurisdictional rules and regulations governing play of wager-based games at the second EGT;

means for preventing the second remote player from participating in the first game session via the second EGT if it is determined that the first set of game/wager-related criteria is not compliant with the second set of jurisdictional rules and regulations governing play of wager-based games at the second EGT;

means for dynamically determining if the first set of game/wager-related criteria is compliant with the first physical casino's rules governing play of the multi-player, wager-based game via the first EGT;

means for preventing the first remote player from participating in the first game session via the first EGT if it is determined that the first set of game/wager-related criteria is not compliant with the first physical casino's rules governing play of the multi-player, wager-based game via the first EGT;

means for dynamically determining if the first set of game/wager-related criteria is compliant with the second physical casino's rules governing play of the multi-player, wager-based game via the second EGT;

means for preventing the second remote player from participating in the first game session via the second EGT if it is determined that first set of game/wager-related criteria is not compliant with the second physical casino's rules governing play of the multi-player, wager-based game via the second EGT;

means for dynamically determining if the first set of game/wager-related criteria is compliant with a third set of jurisdictional rules and regulations governing play of wager-based games at the live casino game table;

means for preventing the first remote player from participating in the first game session via the first EGT if it is determined that the first set of game/wager-related criteria is not compliant with the third set of jurisdictional rules and regulations governing play of wager-based games at the first physical location;

means for preventing the second remote player from participating in the first game session via the second EGT if it is determined that the first set of game/wager-related criteria is not compliant with the third set of jurisdictional rules and regulations governing play of wager-based games at the first physical location;

means for generating a virtual game table graphical user interface ("virtual game table GUI") which represents the live casino game table;

means for causing a first instance of the virtual game table GUI to be displayed at the first EGT;

means for enabling the first remote player to participate in the first game session via interaction with the first instance of the virtual game table GUI;

means for causing a second instance of the virtual game table GUI to be displayed at the second EGT;

means for enabling the second remote player to participate in the first game session via interaction with the second instance of the virtual game table GUI; and means for advancing a game state of the first game session via a first set of activities performed at the live casino game table.

28. A gaming system in a casino gaming network, comprising:

a first electronic game terminal ("EGT") located in a first physical casino venue, the first EGT being remotely located from the live casino game table;

a second electronic game terminal ("EGT") located in a second physical casino venue, the second EGT being remotely located from the live casino game table;

at least one interface for communicating with at least one other device in the gaming network;

a gaming controller;

a memory storing a plurality of instructions;

wherein when the gaming controller executes the plurality of instructions stored in the memory, the gaming controller operates with the at least one interface to:

control a first multi-site, multi-player, wager-based game session ("first game session") conducted via a live casino game table at a first physical location, the first game session having associated therewith a first set of game/wager-related criteria;

receive a first request for a first remote player to participate in the first game session via the first EGT;

dynamically determine whether participation by the first remote player in the first game session via the first EGT is compliant with jurisdictional rules and regulations governing play at the live casino game table location;

prevent the first remote player from participating in the first game session via the first EGT if it is determined that participation by the first remote player in the first game session via the first EGT is not compliant with the jurisdictional rules and regulations governing play at the live casino game table location;

receive a second request for a second remote player to participate in the first game session via the second EGT;

dynamically determine whether participation by the second remote player in the first game session via the second EGT is compliant with the jurisdictional rules and regulations governing play at the live casino game table location;

prevent the second remote player from participating in the first game session via the second EGT if it is determined that participation by the second remote player in the first game session via the second EGT is not compliant with the jurisdictional rules and regulations governing play at the live casino game table location;

identify a first set of game/wager-related criteria associated with the first game session, wherein the first set of criteria includes at least one criteria selected from a group consisting of: time limit per play, amount per wager, max wager, maximum wager, rules to facilitate speed of game play, payout criteria, paytable criteria, game play rules, and wagering rules;

dynamically determine if the first set of game/wager-related criteria is compliant with a third set of jurisdictional rules and regulations governing play of wager-based games at the live casino game table;

prevent the first remote player from participating in the first game session via the first EGT if it is determined that the first set of game/wager-related criteria is not compliant with the third set of jurisdictional rules and regulations governing play of wager-based games at the first physical location;

prevent the second remote player from participating in the first game session via the second EGT if it is determined that the first set of game/wager-related criteria is not compliant with the third set of jurisdictional rules and regulations governing play of wager-based games at the first physical location;

generate a virtual game table graphical user interface ("virtual game table GUI") which represents the live casino game table;

cause a first instance of the virtual game table GUI to be displayed at the first EGT;

if the first remote player is not prevented from participating in the first game session via the first EGT, enable the first remote player to participate in the first game session via interaction with the first instance of the virtual game table GUI;

cause a second instance of the virtual game table GUI to be displayed at the second EGT;

if the second remote player is not prevented from participating in the first game session via the second EGT, enable the second remote player to participate in the first game session via interaction with the second instance of the virtual game table GUI; and advance a game state of the first game session via a first set of activities performed at the live casino game table.

29. The system of claim 28 being further operable to:

dynamically determine, using the first set of game/wager-related criteria, whether participation by the first remote player in the first game session via the first EGT is compliant with a first set of jurisdictional rules and regulations governing play of wager-based games at the first EGT;

prevent the first remote player from participating in the first game session via the first EGT if it is determined that participation by the first remote player in the first game session via the first EGT is not compliant with a first set of jurisdictional rules and regulations governing play of wager-based games at the first EGT;

dynamically determine, using the first set of game/wager-related criteria whether participation by the second remote player in the first game session via the second EGT is compliant with a second set of jurisdictional rules and regulations governing play of wager-based games at the second EGT;

prevent the second remote player from participating in the first game session via the second EGT if it is determined that participation by the second remote player in the first game session via the second EGT is not compliant with a second set of jurisdictional rules and regulations governing play of wager-based games at the first EGT.

30. The system of claim 28 being further operable to:

prevent the first remote player from participating in the first game session via the first EGT if it is determined that participation by the first remote player in the first game session via the first EGT is not compliant with the first set of jurisdictional rules and regulations governing play of wager-based games at the first EGT; and prevent the second remote player from participating in the first game session via the second EGT if it is determined that participation by the second remote player in the first game session via the second EGT is not compliant with the second set of jurisdictional rules and regulations governing play of wager-based games at the second EGT.

31. The system of claim 28 being further operable to:

prevent the first remote player from participating in the first game session via the first EGT if it is determined that participation by the first remote player in the first game session via the first EGT is not compliant with the first physical casino's rules governing play of the multi-player, wager-based game via the first EGT; and prevent the second remote player from participating in the first game session via the second EGT if it is determined that participation by the second remote player in the first game session via the second EGT is not compliant with the second physical casino's rules governing play of the multi-player, wager-based game via the second EGT.

32. The system of claim 28 being further operable to:

prevent the first remote player from participating in the first game session via the first EGT if it is determined that participation by the first remote player in the first game session via the first EGT is not compliant with local rules and regulations governing play of the multi-player, wager-based game at the live casino game table; and prevent the second remote player from participating in the first game session via the second EGT if it is determined that participation by the second remote player in the first game session via the second EGT is not compliant with local rules and regulations governing play of the multi-player, wager-based game at the live casino game table.

33. The system of claim 28 being further operable to:

prevent the first remote player from participating in the first game session via the first EGT if it is determined that participation by the first remote player in the first game session via the first EGT is not compliant with the first set of jurisdictional rules and regulations governing play of wager-based games at the first EGT;

prevent the second remote player from participating in the first game session via the second EGT if it is determined that participation by the second remote player in the first game session via the second EGT is not compliant with the second set of jurisdictional rules and regulations governing play of wager-based games at the second EGT;

prevent the first remote player from participating in the first game session via the first EGT if it is determined that participation by the first remote player in the first game session via the first EGT is not compliant with the first physical casino's rules governing play of the multi-player, wager-based game via the first EGT;

prevent the second remote player from participating in the first game session via the second EGT if it is determined that participation by the second remote player in the first game session via the second EGT is not compliant with the second physical casino's rules governing play of the multi-player, wager-based game via the second EGT;

prevent the first remote player from participating in the first game session via the first EGT if it is determined that participation by the first remote player in the first game session via the first EGT is not compliant with local rules and regulations governing play of the multi-player, wager-based game at the live casino game table; and prevent the second remote player from participating in the first game session via the second EGT if it is determined that participation by the second remote player in the first game session via the second EGT is not compliant with local rules and regulations governing play of the multi-player, wager-based game at the live casino game table.

34. The system of claim 28:

wherein the virtual game table GUI includes a representation of the first remote player located at a first player station of the first virtual game table;

wherein the representation of the first virtual game table includes a representation of the second remote player located at a second player station of the first virtual game table;

the system being further operable to:

dynamically determine a current game state of the first game session based upon gaming activities conducted at the first live game table; and update content presented in the first and second instances of the virtual game table GUI to reflect a current game state at the first virtual game table which is substantially identical to the current game state of the first game session.

35. The system of claim 28 being further operable to:

receive a first set of game play instructions from the first remote player;

cause the game state of the first game session to advance via execution of the first set of game play instructions at the live casino game table; and cause an outcome of at least one future event relating to the second remote player's participation in the first game session to be affected by the execution of the first set of game play instructions at the live casino game table.

36. The system of claim 28 being further operable to:

dynamically determine if the first set of game/wager-related criteria is compliant with a first set of jurisdictional rules and regulations governing play of wager-based games at the first EGT;

dynamically determine if the first set of game/wager-related criteria is compliant with a second set of jurisdictional rules and regulations governing play of wager-based games at the second EGT;

prevent the first remote player from participating in the first game session via the first EGT if it is determined that the first set of game/wager-related criteria is not compliant with the first set of jurisdictional rules and regulations governing play of wager-based games at the first EGT; and prevent the second remote player from participating in the first game session via the second EGT if it is determined that the first set of game/wager-related criteria is not compliant with the second set of jurisdictional rules and regulations governing play of wager-based games at the second EGT.

37. The system of claim 28 being further operable to:

dynamically determine if the first set of game/wager-related criteria is compliant with the first physical casino's rules governing play of the multi-player, wager-based game via the first EGT;

dynamically determine if the first set of game/wager-related criteria is compliant with the second physical casino's rules governing play of the multi-player, wager-based game via the second EGT;

prevent the first remote player from participating in the first game session via the first EGT if it is determined that the first set of game/wager-related criteria is not compliant with the first physical casino's rules governing play of the multi-player, wager-based game via the first EGT; and prevent the second remote player from participating in the first game session via the second EGT if it is determined that first set of game/wager-related criteria is not compliant with the second physical casino's rules governing play of the multi-player, wager-based game via the second EGT.

38. The system of claim 28 wherein the live casino game table is located at third physical casino venue, the method being further operable to:

dynamically determine if the first set of game/wager-related criteria is compliant with the third physical casino's rules governing play of the multi-player, wager-based game at the live casino game table;

prevent the first remote player from participating in the first game session via the first EGT if it is determined that the first set of game/wager-related criteria is not compliant with the third physical casino's rules governing play of the multi-player, wager-based game at the live casino game table; and prevent the second remote player from participating in the first game session via the second EGT if it is determined that the first set of game/wager-related criteria is not compliant with the second physical casino's rules governing play of the multi-player, wager-based game at the live casino game table.

39. The system of claim 38:

wherein the first physical casino venue is different from the third physical casino venue; and wherein the second physical casino venue is different from the third physical casino venue.

40. The system of claim 28 being further operable to:

dynamically determine if the first set of game/wager-related criteria is compliant with a first set of jurisdictional rules and regulations governing play of wager-based games at the first EGT;

prevent the first remote player from participating in the first game session via the first EGT if it is determined that the first set of game/wager-related criteria is not compliant with the first set of jurisdictional rules and regulations governing play of wager-based games at the first EGT;

dynamically determine if the first set of game/wager-related criteria is compliant with a second set of jurisdictional rules and regulations governing play of wager-based games at the second EGT;

prevent the second remote player from participating in the first game session via the second EGT if it is determined that the first set of game/wager-related criteria is not compliant with the second set of jurisdictional rules and regulations governing play of wager-based games at the second EGT;

dynamically determine if the first set of game/wager-related criteria is compliant with the first physical casino's rules governing play of the multi-player, wager-based game via the first EGT;

prevent the first remote player from participating in the first game session via the first EGT if it is determined that the first set of game/wager-related criteria is not compliant with the first physical casino's rules governing play of the multi-player, wager-based game via the first EGT;

dynamically determine if the first set of game/wager-related criteria is compliant with the second physical casino's rules governing play of the multi-player, wager-based game via the second EGT; and prevent the second remote player from participating in the first game session via the second EGT if it is determined that first set of game/wager-related criteria is not compliant with the second physical casino's rules governing play of the multi-player, wager-based game via the second EGT.

41. A computer implemented method for operating a gaming device in a gaming network, the method comprising causing at least one processor to execute a plurality of instructions, including:

controlling a first multi-site, multi-player, wager-based game session ("first game session") conducted via a live casino game table at a first physical location, the first game session having associated therewith a first set of game/wager-related criteria;

receiving a first request for a first remote player to participate in the first game session via the first EGT;

dynamically determining whether participation by the first remote player in the first game session via the first EGT is compliant with jurisdictional rules and regulations governing play at the live casino game table location;

preventing the first remote player from participating in the first game session via the first EGT if it is determined that participation by the first remote player in the first game session via the first EGT is not compliant with the jurisdictional rules and regulations governing play at the live casino game table location;

receiving a second request for a second remote player to participate in the first game session via the second EGT;

dynamically determining whether participation by the second remote player in the first game session via the second EGT is compliant with the jurisdictional rules and regulations governing play at the live casino game table location;

preventing the second remote player from participating in the first game session via the second EGT if it is determined that participation by the second remote player in the first game session via the second EGT is not compliant with the jurisdictional rules and regulations governing play at the live casino game table location;

identifying a first set of game/wager-related criteria associated with the first game session, wherein the first set of criteria includes at least one criteria selected from a group consisting of: time limit per play, amount per wager, max wager, maximum wager, rules to facilitate speed of game play, payout criteria, paytable criteria, game play rules, and wagering rules;

dynamically determining if the first set of game/wager-related criteria is compliant with a third set of jurisdictional rules and regulations governing play of wager-based games at the live casino game table;

preventing the first remote player from participating in the first game session via the first EGT if it is determined that the first set of game/wager-related criteria is not compliant with the third set of jurisdictional rules and regulations governing play of wager-based games at the first physical location;

preventing the second remote player from participating in the first game session via the second EGT if it is determined that the first set of game/wager-related criteria is not compliant with the third set of jurisdictional rules and regulations governing play of wager-based games at the first physical location;

generating a virtual game table graphical user interface ("virtual game table GUI") which represents the live casino game table;

causing a first instance of the virtual game table GUI to be displayed at the first EGT;

enabling the first remote player to participate in the first game session via interaction with the first instance of the virtual game table GUI if the first remote player is not prevented from participating in the first game session via the first EGT;

causing a second instance of the virtual game table GUI to be displayed at the second EGT;

enabling the second remote player to participate in the first game session via interaction with the second instance of the virtual game table GUI if the second remote player is not prevented from participating in the first game session via the second EGT; and advancing a game state of the first game session via a first set of activities performed at the live casino game table.

42. The method of claim 41 further comprising:

dynamically determining, using the first set of game/wager-related criteria, whether participation by the first remote player in the first game session via the first EGT is compliant with a first set of jurisdictional rules and regulations governing play of wager-based games at the first EGT;

preventing the first remote player from participating in the first game session via the first EGT if it is determined that participation by the first remote player in the first game session via the first EGT is not compliant with a first set of jurisdictional rules and regulations governing play of wager-based games at the first EGT;

dynamically determining, using the first set of game/wager-related criteria whether participation by the second remote player in the first game session via the second EGT is compliant with a second set of jurisdictional rules and regulations governing play of wager-based games at the second EGT;

preventing the second remote player from participating in the first game session via the second EGT if it is determined that participation by the second remote player in the first game session via the second EGT is not compliant with a second set of jurisdictional rules and regulations governing play of wager-based games at the first EGT.

43. The method of claim 41 further comprising:

preventing the first remote player from participating in the first game session via the first EGT if it is determined that participation by the first remote player in the first game session via the first EGT is not compliant with the first set of jurisdictional rules and regulations governing play of wager-based games at the first EGT; and preventing the second remote player from participating in the first game session via the second EGT if it is determined that participation by the second remote player in the first game session via the second EGT is not compliant with the second set of jurisdictional rules and regulations governing play of wager-based games at the second EGT.

44. The method of claim 41 further comprising:

preventing the first remote player from participating in the first game session via the first EGT if it is determined that participation by the first remote player in the first game session via the first EGT is not compliant with the first physical casino's rules governing play of the multi-player, wager-based game via the first EGT; and preventing the second remote player from participating in the first game session via the second EGT if it is determined that participation by the second remote player in the first game session via the second EGT is not compliant with the second physical casino's rules governing play of the multi-player, wager-based game via the second EGT.

45. The method of claim 41 further comprising:

preventing the first remote player from participating in the first game session via the first EGT if it is determined that participation by the first remote player in the first game session via the first EGT is not compliant with local rules and regulations governing play of the multi-player, wager-based game at the live casino game table; and preventing the second remote player from participating in the first game session via the second EGT if it is determined that participation by the second remote player in the first game session via the second EGT is not compliant with local rules and regulations governing play of the multi-player, wager-based game at the live casino game table.

46. The method of claim 41 further comprising:

preventing the first remote player from participating in the first game session via the first EGT if it is determined that participation by the first remote player in the first game session via the first EGT is not compliant with the first set of jurisdictional rules and regulations governing play of wager-based games at the first EGT;

preventing the second remote player from participating in the first game session via the second EGT if it is determined that participation by the second remote player in the first game session via the second EGT is not compliant with the second set of jurisdictional rules and regulations governing play of wager-based games at the second EGT;

preventing the first remote player from participating in the first game session via the first EGT if it is determined that participation by the first remote player in the first game session via the first EGT is not compliant with the first physical casino's rules governing play of the multi-player, wager-based game via the first EGT;

preventing the second remote player from participating in the first game session via the second EGT if it is determined that participation by the second remote player in the first game session via the second EGT is not compliant with the second physical casino's rules governing play of the multi-player, wager-based game via the second EGT;

preventing the first remote player from participating in the first game session via the first EGT if it is determined that participation by the first remote player in the first game session via the first EGT is not compliant with local rules and regulations governing play of the multi-player, wager-based game at the live casino game table; and preventing the second remote player from participating in the first game session via the second EGT if it is determined that participation by the second remote player in the first game session via the second EGT is not compliant with local rules and regulations governing play of the multi-player, wager-based game at the live casino game table.

47. The method of claim 41:

wherein the virtual game table GUI includes a representation of the first remote player located at a first player station of the first virtual game table;

wherein the representation of the first virtual game table includes a representation of the second remote player located at a second player station of the first virtual game table;

the method further comprising:

dynamically determining a current game state of the first game session based upon gaming activities conducted at the first live game table; and updating content presented in the first and second instances of the virtual game table GUI to reflect a current game state at the first virtual game table which is substantially identical to the current game state of the first game session.

48. The method of claim 41 further comprising:

receiving a first set of game play instructions from the first remote player;

causing the game state of the first game session to advancing via execution of the first set of game play instructions at the live casino game table; and causing an outcome of at least one future event relating to the second remote player's participation in the first game session to be affected by the execution of the first set of game play instructions at the live casino game table.

49. The method of claim 41 further comprising:

dynamically determining if the first set of game/wager-related criteria is compliant with a first set of jurisdictional rules and regulations governing play of wager-based games at the first EGT;

dynamically determining if the first set of game/wager-related criteria is compliant with a second set of jurisdictional rules and regulations governing play of wager-based games at the second EGT;

preventing the first remote player from participating in the first game session via the first EGT if it is determined that the first set of game/wager-related criteria is not compliant with the first set of jurisdictional rules and regulations governing play of wager-based games at the first EGT; and preventing the second remote player from participating in the first game session via the second EGT if it is determined that the first set of game/wager-related criteria is not compliant with the second set of jurisdictional rules and regulations governing play of wager-based games at the second EGT.

50. The method of claim 41 further comprising:

dynamically determining if the first set of game/wager-related criteria is compliant with the first physical casino's rules governing play of the multi-player, wager-based game via the first EGT;

dynamically determining if the first set of game/wager-related criteria is compliant with the second physical casino's rules governing play of the multi-player, wager-based game via the second EGT;

preventing the first remote player from participating in the first game session via the first EGT if it is determined that the first set of game/wager-related criteria is not compliant with the first physical casino's rules governing play of the multi-player, wager-based game via the first EGT; and preventing the second remote player from participating in the first game session via the second EGT if it is determined that first set of game/wager-related criteria is not compliant with the second physical casino's rules governing play of the multi-player, wager-based game via the second EGT.

51. The method of claim 41 wherein the live casino game table is located at third physical casino venue, the method further comprising:

dynamically determining if the first set of game/wager-related criteria is compliant with the third physical casino's rules governing play of the multi-player, wager-based game at the live casino game table;

preventing the first remote player from participating in the first game session via the first EGT if it is determined that the first set of game/wager-related criteria is not compliant with the third physical casino's rules governing play of the multi-player, wager-based game at the live casino game table; and preventing the second remote player from participating in the first game session via the second EGT if it is determined that the first set of game/wager-related criteria is not compliant with the second physical casino's rules governing play of the multi-player, wager-based game at the live casino game table.

52. The method of claim 51:

wherein the first physical casino venue is different from the third physical casino venue; and wherein the second physical casino venue is different from the third physical casino venue.

53. The method of claim 41 further comprising:

dynamically determining if the first set of game/wager-related criteria is compliant with a first set of jurisdictional rules and regulations governing play of wager-based games at the first EGT;

preventing the first remote player from participating in the first game session via the first EGT if it is determined that the first set of game/wager-related criteria is not compliant with the first set of jurisdictional rules and regulations governing play of wager-based games at the first EGT;

dynamically determining if the first set of game/wager-related criteria is compliant with a second set of jurisdictional rules and regulations governing play of wager-based games at the second EGT;

preventing the second remote player from participating in the first game session via the second EGT if it is determined that the first set of game/wager-related criteria is not compliant with the second set of jurisdictional rules and regulations governing play of wager-based games at the second EGT;

dynamically determining if the first set of game/wager-related criteria is compliant with the first physical casino's rules governing play of the multi-player, wager-based game via the first EGT;

preventing the first remote player from participating in the first game session via the first EGT if it is determined that the first set of game/wager-related criteria is not compliant with the first physical casino's rules governing play of the multi-player, wager-based game via the first EGT;

dynamically determining if the first set of game/wager-related criteria is compliant with the second physical casino's rules governing play of the multi-player, wager-based game via the second EGT; and preventing the second remote player from participating in the first game session via the second EGT if it is determined that first set of game/wager-related criteria is not compliant with the second physical casino's rules governing play of the multi-player, wager-based game via the second EGT.

* * * * *